(12) United States Patent
Brandt et al.

(10) Patent No.: US 6,701,355 B1
(45) Date of Patent: Mar. 2, 2004

(54) SYSTEM AND METHOD FOR DYNAMICALLY SUBSTITUTING BROADCAST MATERIAL AND TARGETING TO SPECIFIC AUDIENCES

(75) Inventors: Gary A. Brandt, Oak Park, IL (US); Donald R. Largen, Lamont, IL (US); Wayne F. Cummings, Naperville, IL (US)

(73) Assignee: Susquehanna Media Co., York, PA (US)

( * ) Notice: Subject to any disclaimer, the term of this patent is extended or adjusted under 35 U.S.C. 154(b) by 0 days.

(21) Appl. No.: 09/408,885

(22) Filed: Sep. 29, 1999

(51) Int. Cl.7 .............................................. G06F 15/16
(52) U.S. Cl. ...................................................... 709/219
(58) Field of Search ................................ 709/217, 218, 709/219, 231

(56) References Cited

U.S. PATENT DOCUMENTS

| | | | |
|---|---|---|---|
| 5,204,969 A | 4/1993 | Capps et al. ................ 395/800 |
| 5,236,199 A | 8/1993 | Thompson, Jr. ............ 273/439 |
| 5,530,469 A | 6/1996 | Garfinkle ....................... 348/1 |
| 5,537,143 A | 7/1996 | Steingold et al. ............. 348/13 |
| 5,557,724 A | 9/1996 | Sampat et al. .............. 395/157 |
| 5,561,708 A | 10/1996 | Remillard .................... 379/96 |
| 5,572,442 A | 11/1996 | Schulhof et al. ............ 364/514 |
| 5,694,163 A | 12/1997 | Harrison ....................... 348/13 |
| 5,699,089 A | 12/1997 | Murray ...................... 345/902 |
| 5,749,043 A | 5/1998 | Worthy ...................... 455/2.01 |
| 5,778,187 A | 7/1998 | Monteiro et al. ........... 709/231 |
| 5,822,537 A | 10/1998 | Katseff et al. ......... 395/200.61 |
| 5,826,102 A | 10/1998 | Escobar et al. ............. 395/806 |
| 5,828,839 A | 10/1998 | Moncreiff ............. 395/200.34 |
| 5,892,536 A | 4/1999 | Logan et al. ................. 348/13 |
| 5,918,213 A | 6/1999 | Bernard et al. .............. 705/26 |
| 5,922,047 A | 7/1999 | Newlin et al. .............. 709/217 |
| 5,928,330 A | 7/1999 | Goetz et al. ................ 709/231 |
| 5,931,901 A | 8/1999 | Wolfe et al. ................ 709/206 |
| 5,933,811 A | 8/1999 | Angles et al. ................. 705/14 |
| 5,945,988 A | 8/1999 | Williams et al. ............ 345/747 |
| 5,963,916 A | 10/1999 | Kaplan ......................... 705/26 |
| 5,983,005 A | * 11/1999 | Montciro et al. ........... 709/231 |
| 6,055,508 A | 4/2000 | Naor et al. ................... 705/11 |
| 6,061,716 A | 5/2000 | Moncreiff ................... 709/204 |
| 6,112,192 A | 8/2000 | Capek ......................... 705/59 |
| 6,349,329 B1 | * 2/2002 | Mackintosh et al. ........ 709/219 |

FOREIGN PATENT DOCUMENTS

| | | |
|---|---|---|
| WO | WO 97/49241 | 12/1997 |
| WO | WO 98/26577 | 6/1998 |
| WO | WO 98/58334 | 12/1998 |

OTHER PUBLICATIONS

Randall E. Stross; "The Microsoft Way :The Real Story of How the Company Outsmarts its Competition" Copyright© 1996, 1997 by Randall E. Stross, Addison–Wesley; Reading, Massachusetts.

* cited by examiner

*Primary Examiner*—David Y. Eng
(74) *Attorney, Agent, or Firm*—Venable LLP; James R. Burdett; Daniel G. Vivarelli

(57) ABSTRACT

An insertion and encoder system monitors broadcasts from a first broadcasting system to determine the presence of segments that can be substituted in a second broadcast. In one embodiment, the system and method determines whether the first segment from the first broadcast had been sold for the second broadcasting system. In this example embodiment, if the first segment had not been sold for the second broadcasting system, it is substituted for a second segment. The system and method accesses an inventory of sold substitution segments and substitutes a sold segment for the unsold segment in real time. In one embodiment, sold advertisement segments are substituted for unsold advertisement segments that are broadcast to a wide audience over the Internet. Segments are selected in accordance with predefined criteria that can include user demographics and/or personal preferences.

7 Claims, 25 Drawing Sheets

SYSTEM AND METHOD FOR DYNAMICALLY SUBSTITUTING BROADCAST MATERIAL AND TARGETING TO SPECIFIC AUDIENCES

BACKGROUND OF THE INVENTION

1. Field of the Invention

The present invention relates generally to broadcast materials, and more particularly to a system and method for dynamically substituting broadcast material and targeting to specific audiences.

2. Related Art

The proliferation of processors and processor-based systems in recent years has led to a tremendous increase in the ability of businesses, industry and individuals to share information. Most computers and workstations in today's homes and offices are connected in some manner to another computer or workstation, either locally or remotely. An early form of such inter-connection of computing systems is the local area network (LAN). Using LAN technology, several computers, workstations, peripherals, or other related devices can be connected to share data among one another and to share network resources.

The Internet can be thought of as an extension of local area network technology. The Internet originally began as a communication network through which government researchers, scientists and other personnel could exchange data or other information between offices and facilities throughout the world. Eventually, the Internet became accessible to the public. Initially, the public was slow to embrace the Internet, and it seemed as if the Internet would remain nothing more than a way for a select group of technologists to exchange e-mails and other data or information. Eventually, however, entrepreneurs who envisioned the growth of the consumer market for Internet services were able to attract a large number of consumers into the fold. As a result, a sort of snowball effect ensued in which more and more consumers become Internet users, and in turn, more and more businesses rushed to get web pages set up on an Internet server. With more businesses offering information, products and services on the Web, more consumers were attracted to the Internet. This cycle rapidly fed on itself virtually creating an explosion on the Internet.

However, the proliferation of the Internet did not stop with the provision of web pages to the Internet users, or web surfers. In the true capitalistic spirit, providers of popular web pages found that they were able to sell advertising space on their web pages. Thus, the Internet became not only a way for businesses to advertise their own businesses on their web pages, but also a way for advertisers to include their ads on others' web pages.

Seemingly overnight, the Internet had transformed into the new advertising medium of the decade. Virtually every business and industry jumped on to the Internet bandwagon. On top of that, hundreds, if not thousands, of new businesses were created to offer Internet-related services. It seemed as if just about everyone was able to capitalize on this new medium.

However, in spite of this proliferation, there were still a few business that were left out of the Internet craze. One example of such a business is the radio industry. Although stations could offer their own web sites on the Internet, such sites typically were not popular among the web surfers, and thus were not a good source of advertising revenues. Thus, even though radio stations could participate in the Internet, their only gains from doing so were PR-related.

Eventually, enterprising web developers decided that they could offer a mechanism by which one or more radio stations or radio networks could offer their broadcast materials over the Internet. One popular Internet site offering this service is www.broadcast.com, although there are others. While many radio stations have agreed to provide their programming across the Internet by such service providers, most have found that this has not led to an increase their advertising revenues. Although these providers offer an excellent service to radio stations and their listeners, most advertisers are not willing to pay a premium for advertising slots simply because the broadcast material is additionally offered to listeners over the Internet. Thus, even though these services allowed radio stations to further participate in the Internet-related industry, their ability to fully take advantage of Internet opportunities is still somewhat limited.

Solutions to this problem have been disclosed in several previously filed patent applications listed below. These applications have been filed by a common assignee, Radiowave.com, of the present patent application. Solutions disclosed by these patent applications relate to systems and methods for supplementing Internet radio broadcasts with coordinated and related audio and visual content. These United States Patent Applications are:

U.S. Pat. No. 6,317,784, issued on Nov. 13, 2001, entitled "SYSTEM AND METHOD FOR PROVIDING BROADCAST MATERIAL HISTORY";

U.S. Pat. No. 6,349,329, issued on Feb. 19, 2002, entitled, "SYSTEM AND METHOD FOR COORDINATING SUPPLEMENTAL MATERIALS WITH BROADCAST MATERIAL";

U.S. patent application Ser. No. 09/163,297, filed on Sep. 29, 1998 entitled "SYSTEM AND METHOD FOR PLAYING SUPPLEMENTAL MATERIALS WITH BROADCAST MATERIAL";

U.S. patent application Ser. No. 09/163,288, filed on Sep. 29, 1998 entitled "SYSTEM AND METHOD FOR COORDINATING COMMUNICATIONS NETWORK ADVERTISING MATERIAL"; and U.S. patent application Ser. No. 09/172,064, filed on Oct. 13, 1998 entitled "SYSTEM AND METHOD FOR AUDIENCE MEASUREMENT".

Each of the these above referenced patent applications are of common assignee and each are fully incorporated by reference herein as though set forth in full.

A problem encountered by using the above systems and methods relates to the advertising spots of local radio stations. The advertising spots that are traditionally broadcast in a relatively narrow market are now getting virtually unlimited coverage in a national and worldwide market over the Internet.

The problem is that local advertisers may not benefit from this increased exposure and are therefore not willing to pay for the increased distribution of their radio advertisements. Further, advertisers that could benefit from these wide distribution markets are not able to participate in a convenient fashion. Thus, it would be desirable to substitute, in real time, different advertisements for local and/or unsold advertisement spots when such spots are widely distributed by Internet broadcasts.

Additional background information on the use of computer networks as a broadcast medium is available from "BROADCAST AND DISTRIBUTION SYSTEM AND METHOD," U.S. patent application Ser. No. 08/961,314, filed Oct. 30, 1997, and "AUDIO CONTENT PLAYER METHODS AND ARTICLES OF MANUFACTURE," U.S. patent application Ser. No. 08/976,971, filed Nov. 25, 1997 now abandoned, both of which are fully incorporated by reference herein as though set forth in full.

SUMMARY OF THE INVENTION

The present invention is directed toward systems and methods for providing enhanced features for the delivery of broadcast material to a listener, viewer or, more generally, a user. According to one aspect of the invention, supplemental materials can be provided to a user in a coordinated fashion with the broadcast materials being delivered. The supplemental materials can be provided in a coordinated fashion such that they relate to the actual broadcast materials as they are being streamed or otherwise delivered to the user. For example, according to one embodiment, the broadcast material is delivered to the user in segments such as, for example, tracks of music, advertisements, and promotional materials in a radio broadcast. In this embodiment, the supplemental materials can be coordinated with the individual segments (e.g., tracks) such that supplemental materials relating to the segments can be provided as the segments are being provided to the user.

Supplemental materials can include, for example, images, video clips, audio clips, data, or other materials that may be provided to the user in conjunction with the broadcast materials. The supplemental materials can also include advertising information that is provided to the user during particular segments of the broadcast material. In one embodiment, this advertising information can be coordinated with the particular segments of the broadcast material such that the value of the advertising is enhanced.

One example application of this aspect of the invention is found in the broadcast of radio broadcast materials over the Internet. According to this example application, the radio broadcast materials can include a plurality of tracks that can be streamed to a user via the Internet. The tracks can include, for example, music tracks, advertising tracks, DJ voice or introduction tracks, promotional tracks, and any other track that a station my wish to broadcast as part of its broadcast material. In one embodiment, the tracks are provided along with program data that can indicate, for example, an identification of the track, the type of track, and other pertinent or relevant information regarding the particular track being broadcast at that time. This information can be provided to an Internet broadcast service provider that "broadcasts" the broadcast materials and the program data to the listener's Internet terminal.

The listener receives the broadcast material and the program data via the Internet connection and plays it on his or her computer, workstation or other Internet terminal. This can be a web page type player or a downloaded player that is resident on the user's terminal. When the user's terminal receives a track to be played, the user's terminal takes the program data associated with that track and uses that data to access one or more servers to retrieve the supplemental information.

One aspect of the present invention is that it allows advertisers to take full advantage of the wide distribution market available when broadcasting over the Internet. An advantage of the present invention is that it increases the value and potential revenues generated for advertisement spots in radio broadcasting by providing for the dynamic substitution of advertisements when broadcasting over a wide distribution network, such as the Internet. For example, a local advertisement that is not suitable for wide distribution market is replaced with a national advertisement that is targeted to a national or worldwide market.

Further, the present invention provides for the selection of substituted advertisements based on the demographics of actual listeners. This is accomplished by taking into account user demographics that are determined by user surveys or the like.

In one embodiment, an insertion and encoder system monitors broadcasts from an on-air system to determine the presence of an advertisement segment. Once an advertisement segment is identified, the system and method determines whether the advertisement has been sold to for the "global market" (i.e. in this example, for wide-range, Internet-based radio broadcasting).

If the ad has been sold for the global market, it is then broadcast over the Internet as is. However, if the ad has not been sold for the global market, the system and method of the present invention accesses an inventory of advertisements that have been sold for the global market. From this inventory, an advertisement is selected in accordance with predefined criteria that includes variety of parameters, depending on each specific implementation of the present invention.

In one embodiment, those parameters include user demographics so that advertisements are targeted to specific users or groups of users. In another embodiment, personal preferences, and user actions, such as web-based buying habits and the like, are taken into account to select an appropriate substituted advertisement.

Further features and advantages of the invention as well as the structure and operation of various embodiments of the invention are described in detail below with reference to the accompanying drawings.

BRIEF DESCRIPTION OF THE DRAWINGS

The present invention is described with reference to the accompanying drawings. In the drawings, like reference numbers indicate identical or functionally similar elements.

DETAILED DESCRIPTION OF THE INVENTION

The present invention is directed toward a system and method for coordinating supplemental materials with broadcast materials delivered to a viewer, listener or other program user. According to one specific implementation of the invention, the invention is directed toward a system and method for coordinating supplemental information such as advertising and promotional information with a radio station broadcast over the Internet. However, as described below, alternative embodiments can include the coordination of supplemental materials such as images, video clips, audio clips, text, data or other materials with the delivery of broadcast material.

Figure 1:
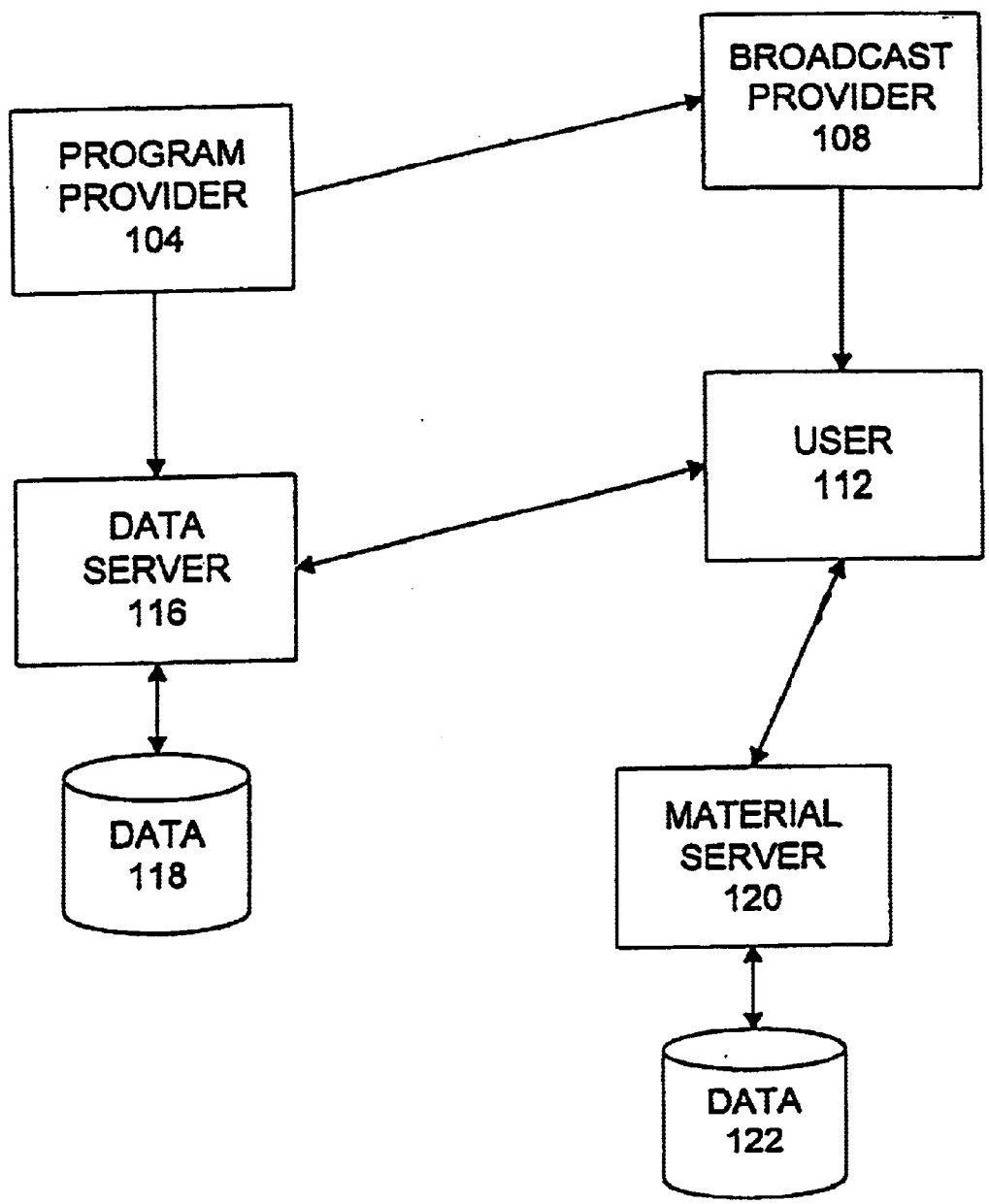
FIG. 1 is a block diagram illustrating an example architecture for providing supplemental materials in coordination with broadcast materials according to one embodiment of the invention.

FIG. 1 is a block diagram illustrating an example architecture for providing supplemental materials in coordination with broadcast materials according to one embodiment of the invention. The example embodiment illustrated in FIG. 1 includes a program provider 104 for providing broadcast materials to a user equipment 112. Program provider 104 can provide, for example, broadcast materials such as a radio program, a video program, or other broadcast materials on another program medium. For example, in one embodiment, program provider 104 can be a radio station broadcasting its radio program to a number of listeners.

Program provider 104 can provide its broadcast materials directly to a user's user equipment 112 or alternatively, via a broadcast provider 108. Broadcast provider 108 may be included to allow the broadcast material to be forwarded to the user via an alternative medium. For example, in one embodiment, an example of a broadcast provider 108 can be a service provider such as, for example, www.broadcast.com that provides radio broadcast materials to user equipment 112 via the Internet. In this document, the term "broadcast" is used to describe the delivery of broadcast materials to one or more than one user or other destination via a hard-wired or wireless communication channel.

Depending on the broadcast or delivery medium, the user equipment can include, for example a processor-based system, such as a personal computer (PC) or other processor-based system, having an appropriate communication interface. In the Internet embodiment described above, user equipment 112 can include, for example, an Internet terminal having an Internet communication interface.

In the embodiment illustrated in FIG. 1, program provider 104 provides information pertaining to the broadcast materials to a data server 116. For example, program provider 104 can provide to data server 116 an identification of the broadcast materials that are being broadcast or otherwise provided to user equipment 112. This data can be sent in real time as the broadcast materials are being broadcast or otherwise sent to user equipment 112. Alternatively, the data can be sent in advance of the delivery of the broadcast materials. If sent in advance, the data preferably also includes a schedule for the programming materials such that supplemental information associated with the broadcast materials can be coordinated with the broadcast materials, as discussed below.

In operation, data server 116 utilizes the data received from program provider 104 to retrieve supplemental materials related to the broadcast materials and to provide those supplemental materials to user equipment 112 in coordination with the broadcast materials. Thus, in one embodiment, Data server 116 uses the data from program provider 104 to retrieve the associated supplemental materials from its one or more data storage databases 118 and provide these materials to user equipment 112.

In the context of the radio station example, data from program provider 104 can include event codes identifying the item being broadcast to user equipment 112. Event codes can be codes indicating, for example, a current song being played, an advertising spot being played, or other material in the stream of broadcast materials being broadcast by program provider 104. Continuing in this example scenario, data server 116 can retrieve supplemental information pertaining to the specific item of programming being broadcast such as, for example, images, video clips, or textual data relating to the material being broadcast.

In an alternative embodiment, the supplemental materials are not necessarily stored in databases 118 of data server 116. Instead, the supplemental materials can be stored in one or more external data bases 122 associated with one or more external servers 120. Thus, also illustrated in FIG. 1 is a material server 120 and its associated data base 122. In this embodiment, when data server 116 uses the data from program provider 104 to retrieve locational or other identification information about the supplemental information to be coordinated with a broadcast. Data server 116 provides this locational or identification information to user equipment 112. User equipment 112 then uses this locational or other identification information to access server 120 to retrieve the associated supplemental materials from one or more material servers 120.

Figure 2:
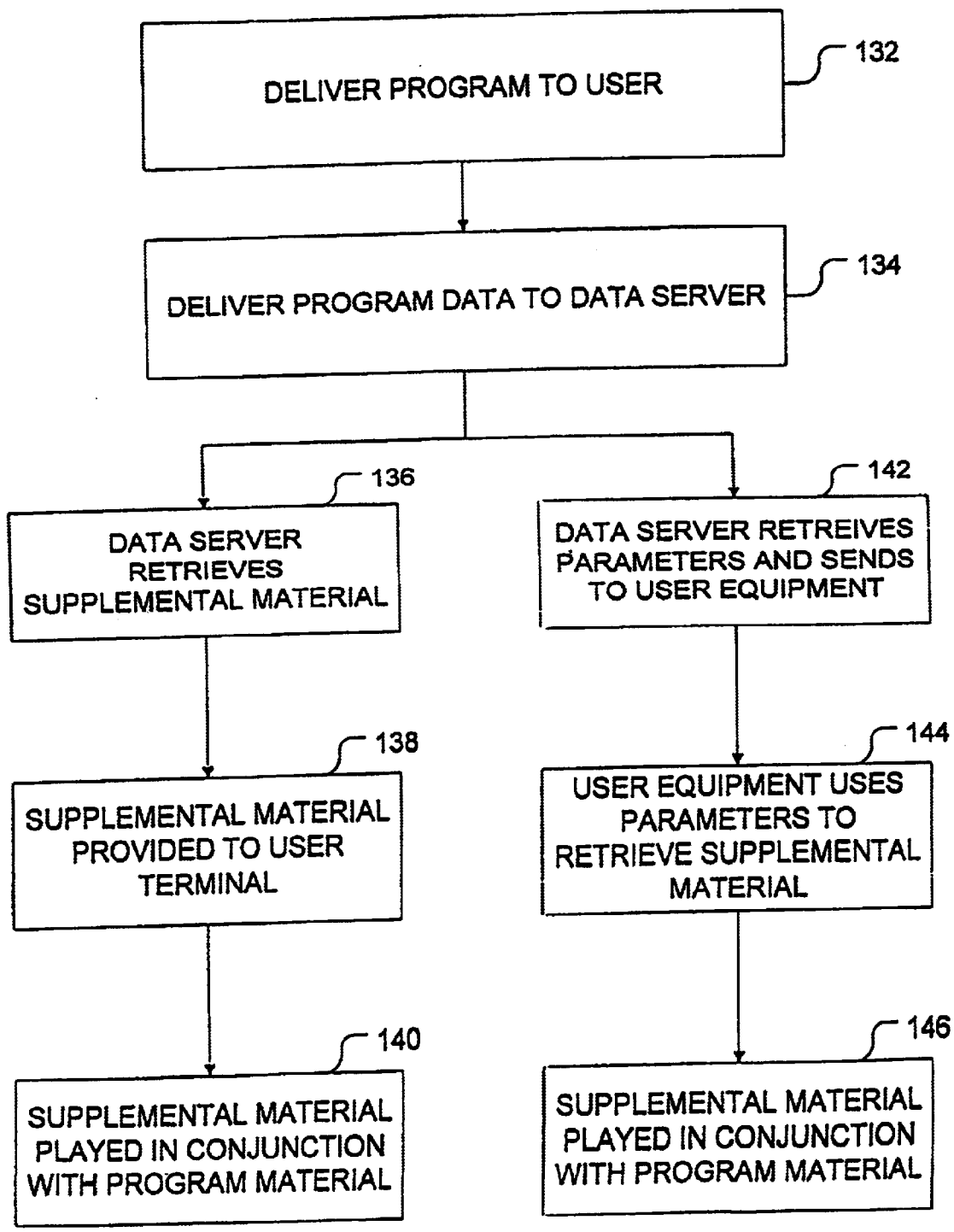
FIG. 2 is an operational flow diagram illustrating a process for coordinating supplemental materials with the program provided to user equipment according to one embodiment of the invention.

FIG. 2 is an operational flow diagram illustrating a process for coordinating supplemental materials with the program provided to user equipment 112 according to one embodiment of the invention. Referring now to FIG. 2, in a step 132, program provider 104 delivers its broadcast materials to user equipment 112. As stated above, the broadcast materials can be audio, video or other broadcast materials including, for example, a radio broadcast, a television broadcast, an educational broadcast or other delivery of broadcast materials to a user equipment 112. As illustrated in FIG. 1, delivery of the broadcast materials can also be accomplished via an intermediary broadcast provider 108. In one example, the intermediary broadcast provider 108 can be, for example, an Internet provider 108, or other intermediary provider.

In a step 134, program provider 104 delivers data pertaining to the broadcast materials to data server 116. This data can include, for example in one embodiment, data identifying the broadcast material or the particular portion of broadcast material currently being broadcast to user equipment 112. This data can be provided in real time as the broadcast material is being provided to user equipment 112, or, alternatively, in advance of delivery of the broadcast material.

As described above with reference to FIG. 1, there are at least two alternative embodiments by which the supplemental materials can be provided to user equipment 112 in coordination with the broadcast materials. Each of these embodiments are described with reference to FIG. 2 and are illustrated as parallel flow paths in the diagram of FIG. 2. In a step 136, data server 116 uses the data from program provider 104 to retrieve the supplemental materials from data base 118. As stated, these supplemental materials can include, for example, audio, video, image, data, or other information.

In a step 138, data server 116 provides the retrieved supplemental materials to user equipment 112 such that they can be played, displayed, or otherwise provided to the user in coordination with the broadcast materials. In one embodiment the data is provided to data server 116 in real time as the broadcast material is provided to user equipment 112. In this embodiment, data server 116 can simply retrieve the supplemental materials and provide them to user equipment 112 as the server receives the data from program provider 104. Alternatively, where the data is provided by program provider 104 in advance of the broadcast material, data server 116 can build a schedule for retrieval of the supplemental materials and their delivery to user equipment 112. In these or other alternatives, the supplemental materials are provided to user equipment 112 such that they can be presented to user equipment 112 in coordination with the broadcast materials. In a step 140, the supplemental materials can be played, displayed, or otherwise provided to the user in coordination with the broadcast materials.

Referring now to the parallel path of FIG. 2, in a step 142, the data server 116 uses the data from program provider 104 to retrieve supplemental material parameters from database 118. These parameters can include, for example, locational or other identification information pertaining to the supplemental materials. In one embodiment, this information provides an identification of where user equipment 112 may locate supplemental materials on another server such as, for example, server 120. These retrieved parameters are provided to user equipment 112.

User equipment 112 then uses this information to retrieve the supplemental materials from another location. In one embodiment, user equipment 112 access server 120 to retrieve the supplemental materials from data base 122. This is illustrated by a step 144.

This data is now available to user equipment 112 in coordination with the broadcast materials. Thus, in a step 146, the supplemental materials can be played, displayed, or otherwise provided to the user in coordination with the broadcast materials. As with the previous embodiment, data from program provider 104 can be presented in real time or in advance of the broadcast materials.

In one embodiment, user equipment 112 can include the processing ability to either receive the supplemental materials from server 116 and provide them to the user in coordination with the broadcast materials or to retrieve the supplemental materials from material server 120 and provide them to the user in coordination with the broadcast materials. For example, in one embodiment, user equipment 112 is a computer system capable of receiving information via communication links including, for example, the Internet, and also capable of retrieving information using similar links. Where user equipment 112 is a computer system, a player may be provided to the user such that the user equipment 112 can play the broadcast material and the supplemental materials provided from program provider 104.

Figure 3:
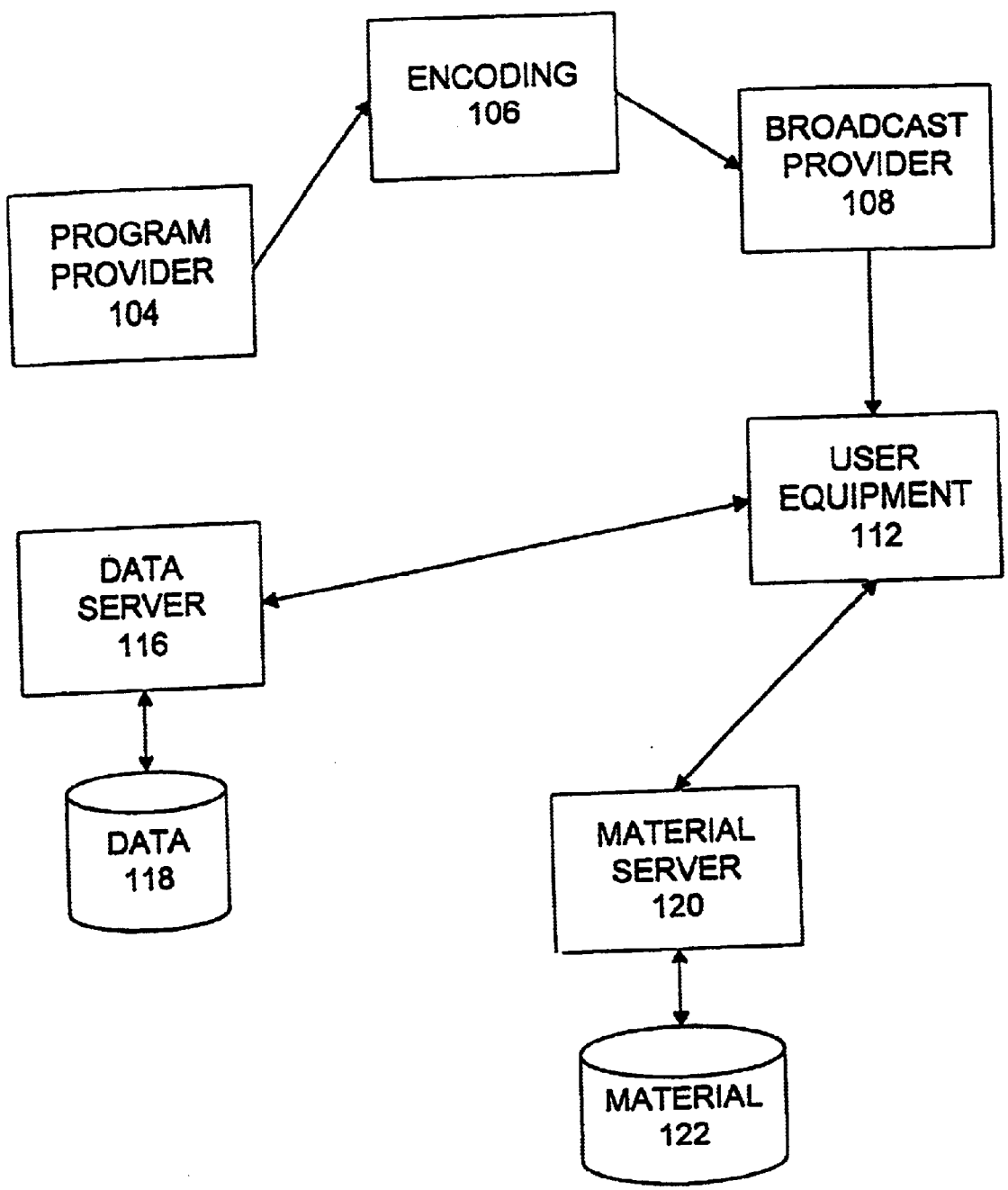
FIG. 3 is a block diagram illustrating an alternative embodiment to the architecture illustrated in FIG. 1.

FIG. 3 is a block diagram illustrating an alternative embodiment to the architecture illustrated in FIG. 1. According to the alternative illustrated in FIG. 3, program data relating to the broadcast material is not directly provided from program provider 104 to data server 116. Instead, in this embodiment, data pertaining to the broadcast materials is provided along with the broadcast materials to the user equipment 112. This can be done either directly, or via an interim provider such as, for example, broadcast Internet service provider 108.

Figure 4:
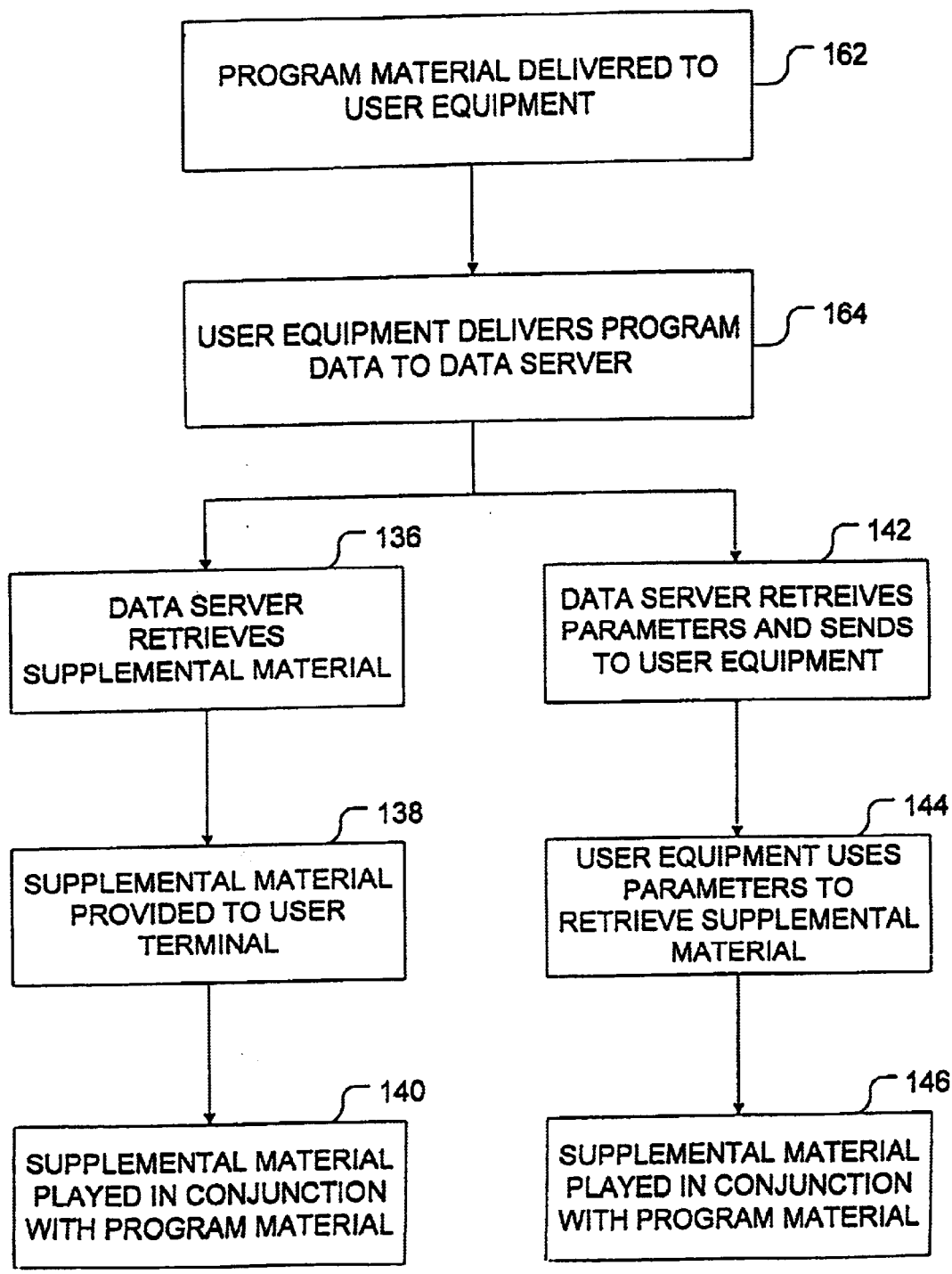
FIG. 4 is an operational flow diagram describing the coordination of supplemental materials with the broadcast material according to the example embodiment illustrated in FIG. 3.

FIG. 4 is an operational flow diagram describing the coordination of supplemental materials with the broadcast material according to one or more realizations of the embodiment illustrated in FIG. 3. Referring now to FIG. 4, in a step 162, program provider 104 delivers the broadcast material to user equipment 112. In this step, the data relating to the broadcast material (i.e., the program data) is included in the signal provided to user equipment 112. In one embodiment, the program data and broadcast material are multiplexed onto a single data link and provided to user equipment 112 either via a broadcast provider 108, or directly to user equipment 112.

In embodiments where the data and broadcast material delivered to user equipment 112 is ultimately in digital form, the program data can be interleaved with the broadcast materials in a digital data stream. This can be done by interleaving packets, or by interleaving the data in packet data blocks, or by interleaving the data streams together.

In a step 164, user equipment 112 delivers the program data to data server 116. Data server 116 receives the program data in real time or near real time with the associated segment of broadcast material. From this point on, the operation can continue as illustrated above in FIG. 2 whereby the supplemental information is either retrieved directly from data base 118 and provided to user equipment 112 (steps 136, 138, 140) or whereby locational or other identification information is provided to user equipment 112 which then in turn receives this supplemental information from data base 122 (steps 142, 144 and 146).

Having thus generally described a system and method for coordinating supplemental information with broadcast material provided to user equipment 112, a specific application of this generalized system is now described. This specific application is described in terms of the above-mentioned example in which a radio station provides its normal broadcast material to a listener. In addition, the radio station desires that additional supplemental materials be provided to the listener through the use of one or more servers. Although the invention is now described in terms of this specific application, it will become apparent to one of ordinary skill in the art after reading this description that the invention is not limited to this specific application but can be more generally applied to other applications as well. This description is thus provided for illustration purposes only.

Figure 5:
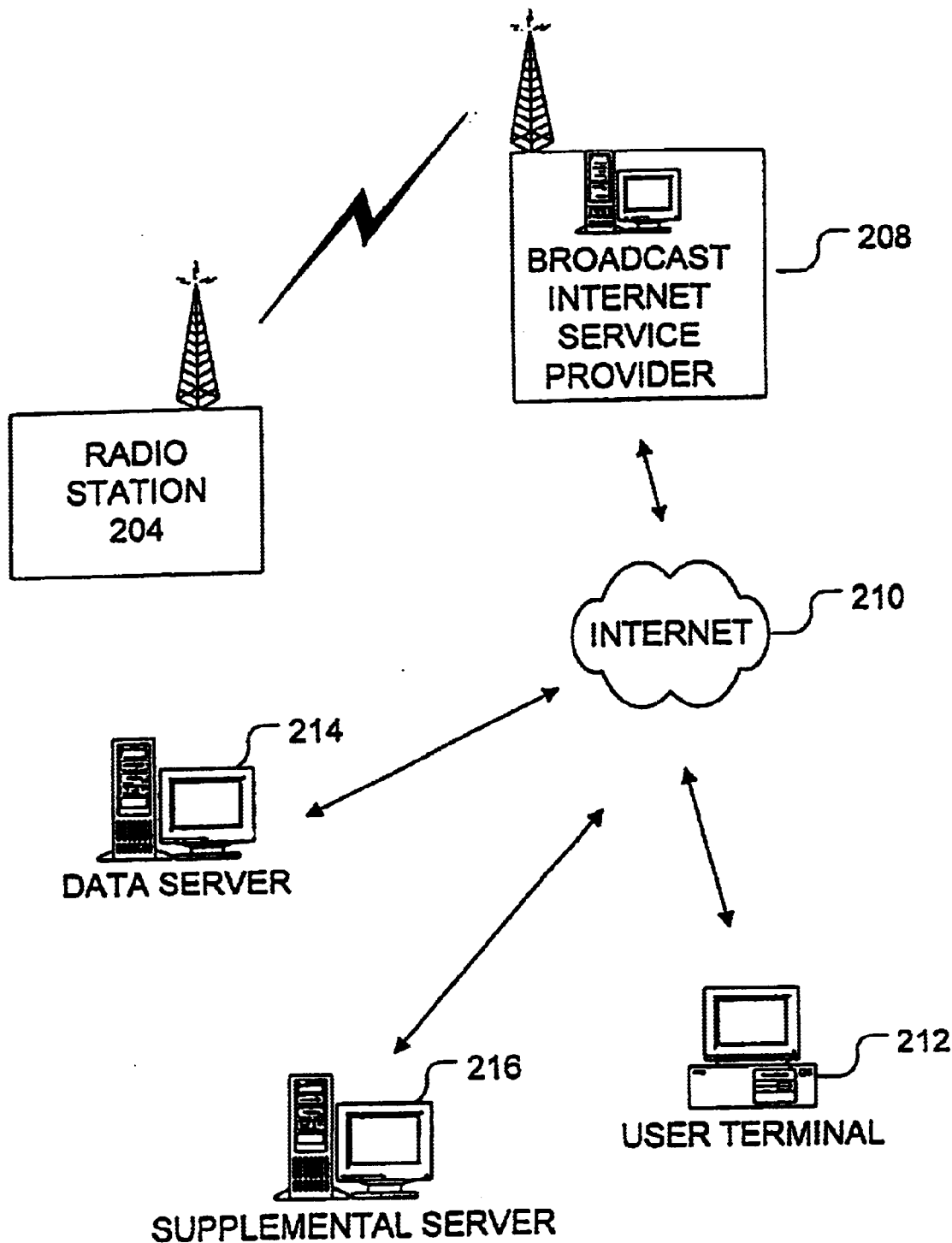
FIG. 5 is a block diagram illustrating the example application of the invention in which a radio station provides its broadcast materials to a listener at a user terminal according to one embodiment of the invention.
Figure 6:
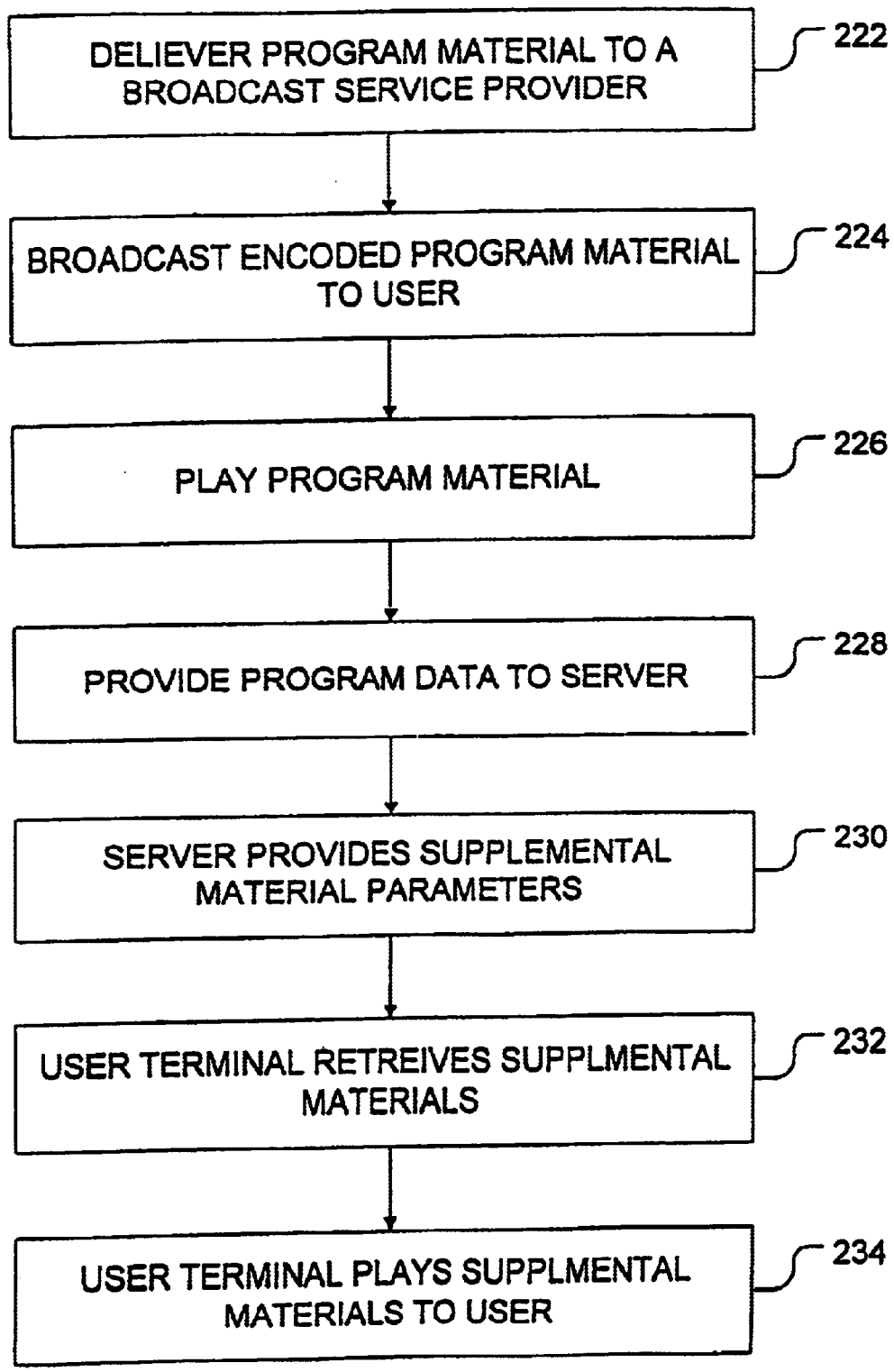
FIG. 6 is a operation flow diagram illustrating an example process by which supplemental information can be coordinated with the broadcast material in the example application illustrated in FIG. 5.

FIG. 5 is a block diagram illustrating the example application of the invention in which a radio station 204 provides its broadcast materials to a listener at a user terminal 212 according to one embodiment of the invention. FIG. 6 is a operation flow diagram illustrating an example process by which supplemental information can be coordinated with the broadcast material in the example application illustrated in FIG. 5.

In a step 222, radio station 204 provides its broadcast materials to a broadcast Internet service provider 208. In one embodiment, the materials provided to broadcast Internet service provider 208 can include the actual radio broadcast from radio station 204 as well as event codes indicating current tracks in that broadcast, current advertising in that broadcast, or other data associated with the real time broadcast. In one embodiment, these signals can be broadcast via an AM or FM radio link to broadcast Internet service provider 208.

In this embodiment, both the audio and the data can be modulated onto an AM or FM carrier signal at a desired frequency. In alternative embodiments, the broadcast materials and the data can be provided to broadcast Internet service provider 208 in a digital format, encoded, compressed or otherwise, through either a hard-wired or wireless communication link. As is well known to those in the radio industry, many radio stations pre-program their broadcast material such that it can be broadcast in an automated fashion. Thus, the broadcast material and program data can also be provided in this fashion. Systems available to facilitate such pre-programming include the DAD Pro system available from ENCO Systems, Inc., the Master Control from Radio Computer Systems, Inc. and the Audio Wizard from Prophet Systems, Inc.

These systems typically store the broadcast materials in advance on a hard drive or other data storage. As such, this data in digital form can be downloaded to broadcast Internet service provider 208 via any of a number of communication links and protocols and in any of a number of formats. Alternatively, a copy of a disc or other electronic medium on which the program is stored can be provided to broadcast Internet service provider 208 to physically provide the broadcast material and data.

In an example application of the radio station, the program data can include, for example, a cut number, a category of the cut, and a duration of the cut. In these embodiments, the cut number can include number or other alphanumeric designation assigned by the radio station for recorded components that air on their station. These components can include, for example, songs, commercials, promotions, or other "cuts" or segments that may air on the radio. The program data can also include an identification of the broadcasting station, allowing unique codes or data sets to be maintained for different stations.

The cut number can be a numeric or alphanumeric identification (ID) that identifies the particular cut. The category of the cut can include, for example, an identification of the type of cut to which the cut number or program data refers. For example, the cut category may differentiate between music, ad traffic, DJ segments, and link promos. Other or additional categories can be included as well.

Additionally, information pertaining to the format of the cut can be included as well. Such format information can further indicate a type of music (e.g., pop, rock, jazz, classical, country and western, etc.), or a type or category of product being advertised (e.g., clothing, food and beverage, insurance, automobile services, etc.). This format information can be used to key particular pieces or categories of supplemental material to the broadcast.

As stated, a station can include a station ID in this program data to uniquely identify that station from among a plurality of other stations that may be sending data to broadcast Internet service provider 208. In one embodiment, however, broadcast Internet service provider 208 does not need such an identification signal as it may use other means for determining the identity of the radio station 204, such as, for example, the channel on which the signal is received.

In alternative embodiments, analogous data fields can be provided with the program data. For example, other broadcast material types can include a segment ID, analogous to the cut code, or cut number, and identifying the segment; a segment category, identifying a category or class to which the segment belongs.

In a step 224, broadcast Internet service provider 208 "broadcasts" the broadcast material including the program data to user terminal 212. In the embodiment illustrated in FIG. 5, this "broadcast" is via the Internet 210. Thus, broadcast Internet service provider 208 provides the broadcast materials in a digital format downloaded to user terminal 212 via the Internet 210. In the illustrated embodiment, this digital data includes the broadcast material and the program data. As stated with reference to FIG. 1, in alternative embodiments, the program data can be provided directly to data server 214, which transmits the data to user terminal 212.

User terminal plays the broadcast material to the user as illustrated by a step 226. In one embodiment, user terminal 212 can access and "play" the broadcast material via a web page format. In an alternative preferred embodiment, user terminal 212 includes a player that is used to play the broadcast material downloaded via the Internet 210. This player can be a general purpose audio player or audio/video player capable of playing the broadcast material, as well as any received supplemental materials. Specific embodiments of an exemplary player are described below, although alternative players can be implemented.

In a step 228, user terminal 212 retrieves the program data from the downloaded broadcast materials and provides this program data to data server 214. Again, this program data can include data pertaining to a specific portion of the broadcast material currently being broadcast. In one embodiment as discussed above, this program data can include a cut number, a cut category, and a duration. Additionally, this can include a station ID such that cut number or other codes from different stations can be differentiated. As stated above, the station ID can be generated originally from radio station 204 and provided to broadcast Internet service provider 208 and thus included in the downlink to user terminal 212 via the Internet 210.

Alternatively, station identification can be generated by the user terminal 212 based on a particular station that the user is currently listening to. For example, in embodiments where user terminal 212 includes a player, the station selected on that player can be identified by the player and this identification included in the transmission to data server 214. In one embodiment, the data transmitted to data server 214 is also transmitted over the Internet 210. However, alternative communication means could be included. Preferably though, the Internet is used as the communication resource without requiring additional communication media to be introduced.

In a step 230, data server 214 uses the program data to retrieve information pertaining to supplemental materials. As described above, the supplemental materials can include, for example, images, videos, audios, text, or other data. In one embodiment, the information or parameters retrieved by data server 214 can include, for example, a URL or other location information to identify where the one or more various supplemental materials may be located on additional supplemental servers 216. Data server 214 returns the information pertaining to the supplemental materials to user terminal 212. This return path can also be implemented by the Internet 210 or other communication path.

Additionally, as stated above, some or all of the supplemental materials may be located on data bases directly associated with ID server 214. In this alternative, these materials can be directly returned to user terminal 212.

In a step 232, user terminal 212 uses the information provided by data server 214 to retrieve the supplemental materials from another server such as, for example, supplemental server 216. In Internet implemented embodiments, a URL provided by data server 214, for example, can be used by user terminal 212 to retrieve web-based images, videos, audio clips, text files, HTML files, or other data or information from a web server via the Internet.

In a step 234, user terminal 212 provides the retrieved supplemental materials to the user while the user is listening to the broadcast materials. This provision is generally referred to as "playing" the supplemental materials, regardless of whether the played materials are audio, video, still images, text or other data. Because the supplemental materials can be retrieved based on the program data associated with a current segment, the supplemental materials can be coordinated with the broadcast material.

As can be seen by the above description, there is a wealth of additional supplemental information that can be provided to a user at his or her user terminal 212 to accompany the broadcast materials broadcast by radio station 204. To list just a few examples, the user may be provided with an image of an album currently being played, album title, artist, and track number, links to purchase the album, additional materials such as promotional materials, concert schedules and materials, memorabilia, artists bios, other images or videos relating to the album or artists, or virtually any other information that may be somehow related to the current item being played by radio station 204.

Additionally, advertising information can be retrieved and provided on user terminal 212 in conjunction with the current broadcast material. For example, particular advertising spots may be keyed to particular songs or broadcast material to further enhance the user interface. Advertising can be keyed to attributes identified by the program data such as music types, products or product categories, artists, and so on.

Additionally, where the current broadcast material is an advertising spot, additional supplemental information may be coordinated with that advertising spot to allow the advertiser to offer special goods or services to the user. For example, the supplemental materials may provide electronic or virtual coupons that can be provided to the listener in conjunction with a broadcast advertisement. For example, the supplemental materials can include a coupon that is downloaded to the user and printed by user terminal 212, or a special alphanumeric code that can be written down by the user and brought to a point-of-sale outlet.

Another example of supplemental materials in the advertising or promotional capacity may include the provision of contest materials to the users. For example, the supplemental materials may include lottery numbers, electronic "puzzle" or game pieces, and the like.

Still further, banner ads or other advertisements may be pulled up, and their display can be coordinated with the broadcast material. For example, the advertisements can be directed toward products or services related to the current track, or other advertisements that may appeal to listeners of the current broadcast material. As further described below in conjunction with this and other embodiments, there is a whole host of additional supplemental material that can be provided in coordination with the broadcast material.

As stated above, in one embodiment, the interface between radio station 204 and user terminal 212 can at least in part implemented via the Internet 210. Additionally, the link by which user terminal 212 accesses data server 214 to retrieve information pertaining to the supplemental materials can also be implemented by the Internet. Although communication media such as the Internet 210 have built-in latencies that may impact different user terminals differently, it is conceivable that a large number of user terminals 212 may attempt to access data server 214 simultaneously on the receipt of new program data. As such, random delay can be inserted into the path between a broadcast Internet service provider 208 and a one or more user terminals 212 listening to the broadcast. This random delay, which can be, for example, as much as 20 to 40 seconds, can allow the various accesses to data server 214 to be staggered among the plurality of users. As such, the load on data server 214 as well as on any supplemental servers 216 can be somewhat leveled.

Alternatively, the process can be randomized to spread out the impact to servers 214, 216. In one embodiment, the system can look ahead and use cut codes from future broadcast materials to retrieve supplemental information in advance, at randomized time intervals to level the server load. This can be accomplished, for example where cut codes are provided directly to server 214 in advance of the program.

In yet another embodiment, a look-ahead feature is provided, wherein program data for one or more upcoming tracks is used to retrieve supplemental materials prior to the actual playing of those tracks. Thus, supplemental materials can be retrieved in advance, and scheduled to occur at times when the servers are not being accessed by a large number of other users.

Additionally, the digital data provided to user terminal 212 can be compressed or encoded to allow for a more efficient communication path. In one embodiment, compression is provided using the commercially available encoders such as, for example Microsoft's Net Show or Real's Sure Stream, and others. As already stated, the example embodiment described with reference to FIGS. 5 and 6 can be implemented in alternative embodiments with, for example, alternative broadcast material, alternative communication interfaces, and alternative forms of supplemental materials.

Figure 7:
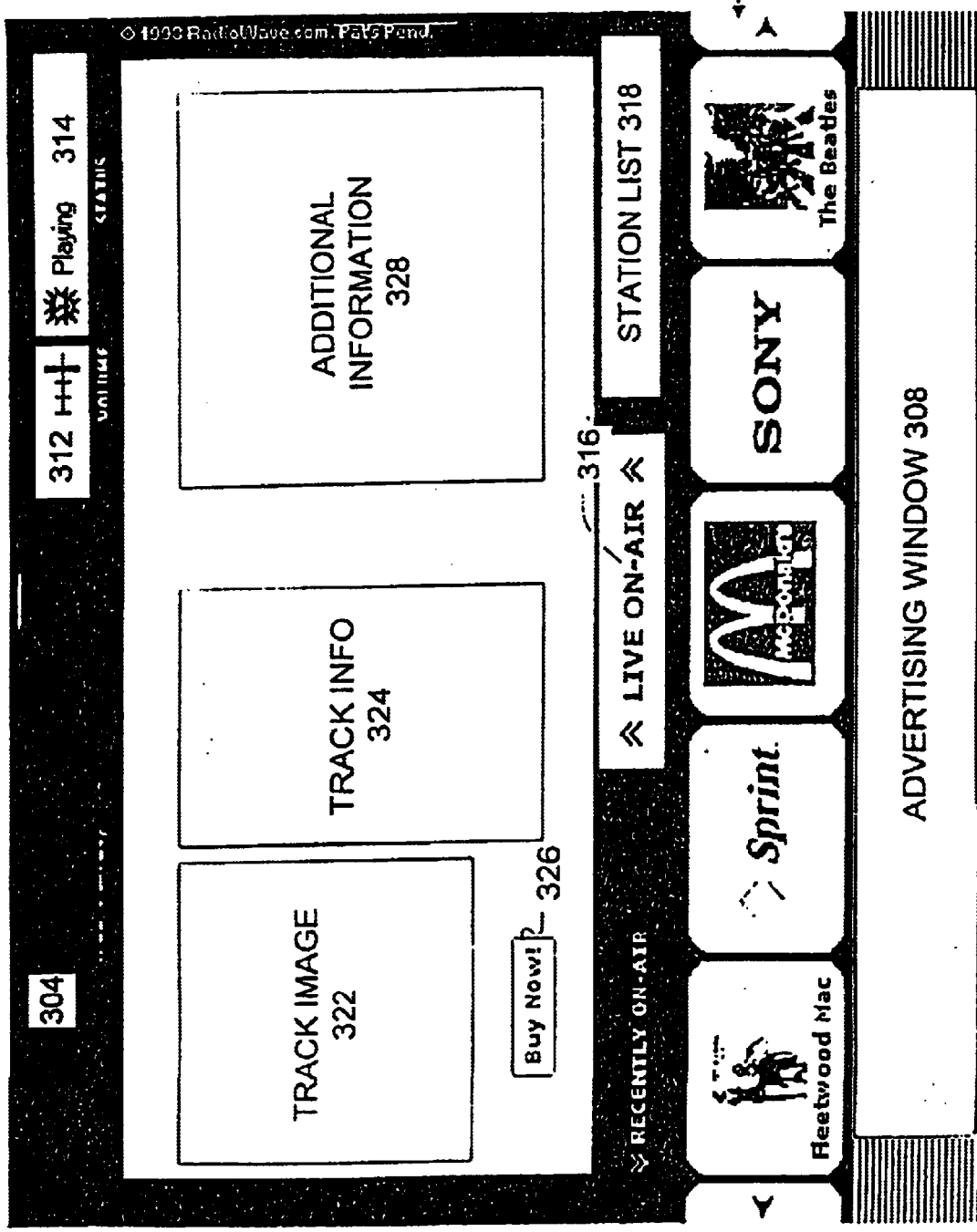
FIG. 7 is a diagram illustrating an example user interface for an example player according to one embodiment of the invention.

As stated above, in one embodiment, a player can be downloaded to the user terminal 212 to allow the user terminal 212 to play the broadcast material broadcast from the broadcast Internet service provider 208. The player is a software application resident on user terminal 212. Although the format and features of such a player are theoretically unlimited, one example player is now described in order to illustrate the features and functionality that can be provided or included in one or more alternative embodiments of a player. FIG. 7 is a diagram illustrating a screen shot of an example player according to one embodiment of the invention. Although this example player is now described in terms of the example screen shot, it will become apparent to one of ordinary skill in the art after reading this description how alternative players can be implemented and how alternative user interfaces or user screens can be provided with a player.

Referring now to FIG. 7, the player illustrated in FIG. 7 includes four parts: a data window 302, a player interface 304, a history window 306, and an advertising window 308. Each of these components are now described in accordance with one example implementation. In the example illustrated in FIG. 7, player interface 304 can include virtual buttons or selectors that can be selected or otherwise manipulated by the user using a mouse, track ball, keyboard, touch-screen display or other pointing or manipulation device. The controls illustrated in the example of FIG. 7 include a volume control 312, a status display 314, a on-air display 316, and a station list button 318.

Although not illustrated, other controls or input devices can be provided including, for example, a tuner button or knob to allow stations to be changed or "tuned" using the player interface 304 or another interface. Also, the player interface 304 can include other controls such as, for example, balance controls, tone controls, a mute button, and other controls or features that may be desirable for an audio or audio/video player.

Data window 302 provides a place to display supplemental information or materials retrieved from other servers such as data server 116 or supplemental server 120. For the example of the radio station as provided in FIG. 5, data window 302 can include an album image 322, artist or album or track information 324, a buy now button 326, and additional information selection area 328. Data window 302 can be implemented to include other or additional information or supplemental materials as well.

In embodiments where user terminal 212 is provided with URL's to retrieve supplemental materials, the URL's can be used to retrieve some or all of the information provided in the example data window 302 and display the retrieved information. In alternative embodiments, other mechanisms can be used to retrieve and display information in data window 320.

Returning now to the specific example, album image 322 is a picture or other image, preferably in a GIF format (e.g., *.gif) that provides a graphical representation to accompany the current song being played. These GIF images can be stored locally on data server 214 and provided to user terminal 212 upon receipt of the program data, or otherwise retrieved by user terminal 212 from supplemental server 216. In one embodiment, the album image 322 is an image similar to or the same as the album cover image. Thus, for example, a listener tuning into a radio station using the player can also view the album cover of the album on which the current song can be found.

Where the current track is an advertising track, album image 322 may be an image designated by the advertiser that the advertiser would like listeners to be able to view upon hearing the advertisement being played. This for example can be pictures of the product, company logos, videos, or other images that the advertisers feel would entice the listener or provide additional information to the listener.

Track information 324 can be used to provide additional information regarding the current track. For example, where the current track is music, track information 324 can display the artist's name, the current song being played, the album on which the current song can be found, the record label, and any other information that may be useful or pertinent regarding the current track. Similarly, when the track being played is a commercial, product information, specifications, sizes, prices, or any other pertinent material or desirable information can be displayed in track space 324. As with the other forms of supplemental information, this information can be directly retrieved from a data server 214 or alternatively via supplemental server 216.

Preferably, in one embodiment, a retrieval and display of album image 322 and track information 324 occurs automatically without user interaction upon receipt of program data. That is, these images and information are retrieved by user terminal 212 as soon as the program data is received. Playing of the track can begin immediately, or can be delayed until some or all of the supplemental materials are received.

Additional info portion 328 can be used to provide additional information to the user or to provide menu selections that the user can interact with to select or obtain additional information or supplemental materials regarding the current track. For example, additional information can include buttons to allow the user to select additional information such as, for example, artist information, concert tour information, album information, a "libretto" having words to the track being played or to other tracks on the current album, ticket information for upcoming concerts, merchandizing materials, and other information that may be of value or that a user may foreseeably desire.

Preferably, in one embodiment, these selections provide information pertaining to the current track being played, again based upon the program data that is received for the current track. This can be information relevant to a current song being played or additional information relative to an advertisement being played. In one embodiment, the specific information "behind" these buttons is not retrieved by user terminal 212 until a button is clicked. Therefore, in this embodiment, user terminal does not go through the steps of retrieving information from a server until that information is actually requested. Alternatively, of course, all of this information can be accessed and retrieved upon receipt of a program data code; however, this may result in unnecessary loading of the communication channels.

Additionally, in one embodiment, the URL's or other locational information pertaining to the information behind these buttons is also not received or retrieved from ID server 214 until requested. Alternatively, the URL's for the information are retrieved such that the response time when a button is clicked is that much faster for the user. As stated, for advertisements, this information or the buttons can provide selections pertinent or relevant to the product being advertised. For example, selections such as additional product information, shipping or delivery information, availability information, links to a company's complete catalog or web page, product safety information, competing product information, or other information that a user may find useful or relevant can be linked to using additional information selection area 328.

Also illustrated in the example player of FIG. 7 is a buy now button 326. In one embodiment, buy now button 326, when selected, activates a link to a source whereby the user can purchase the album title being played. For example, in one embodiment, when the user clicks buy now button 326 the URL associated with a supplier of the album is retrieved. The user terminal 212 accesses the supplier's web site, allowing the user to purchase the album on-line. One example of a supplier web site is www.amazon.com. In one embodiment, buy now button 326 can bring up a list of potential suppliers such that the user can select which of a plurality of suppliers he or she wishes to access to purchase the album. Alternatively, in other embodiments, the user is not provided with the choice, but instead a single click on buy now button 326 brings the user directly to the preferred supplier. The supplier may of course vary depending upon the album title as not all suppliers carry all titles.

In one embodiment, when program data is received at user terminal 212 and used to access the supplemental information, this supplemental information returned for the album title is a specific page within the supplier that links directly to that particular album. For example, where the supplier is www.amazon.com, the URL retrieved to be associated with the buy now button 326 is the URL that maps directly to the page or pages in the Amazon.com® website that relate to the current track or album. Therefore, the user in this embodiment does not have to work his or her way through several web pages to get directly to the pages pertaining specifically to the album being played.

In one embodiment, when the buy now button 326 is clicked, the appropriate or related web pages can be brought up directly within data window 302. They can be configured to span the entire area of data window 302, or alternatively, to be a subset thereof. Additionally, a separate window can be opened or a separate browser launched, to allow the retrieved pages to be viewed in a windowed manner with respect to the player. Of course, the player and the window can be sized such that they both can be viewed simultaneously. The player is not limited to a single buy now button 326 and can have buy now buttons relating to the album, concert tickets, or additional materials. Also in this embodiment, it is not necessary that the buy now button 326 be on the first instance of data window 302. Buy now buttons can be interspersed within the various supplemental images that are brought up as the user navigates through the variety of supplemental information available.

Additionally, the supplier does not have to be an on-line supplier. In these alternative embodiments, buy now button 326 can execute another action to facilitate purchase of the title or advertised product by the -alternative supplier. For example, the button can cause an e-mail purchase-order to be generated and sent, a phone call to be placed, or some other purchase-initiating action.

In one embodiment, concert information can be provided specifically based on the geographic location of the user. Thus, a user can immediately see when the artist will be appearing next in his or her area. Again, a buy now button can be associated with this concert such that the user can access a site selling tickets to the concert or concerts, or otherwise initiate a purchase of concert tickets.

In another embodiment, a button can be provided to allow the user to obtain information regarding other artists with a similar style, feel, or sound as the current artist or track. Therefore, if a listener is particularly fond of the selection being played, that listener can search for other titles or artists who also have a similar sound, style, or feel. This embodiment can use a data base that provides relational information for the various artists based on their style, sound, or other features or characteristics of the artist. In an extension of this embodiment, the user or listener may also be provided with the ability to click to select sample sound tracks from various other artists or albums that are selected in this manner.

Therefore, if a user likes a particular sound and wants to hear a brief sample of an album by another artist, this can be accomplished with a simple selection by the listener. In one embodiment, this can be facilitated by providing the URL's of locations where the sample tracks can be found. Alternatively, a data base can be maintained within supplemental server 216 that allows sample tracks to be stored directly therein. Additionally, sample tracks can be provided for the current album such that the listener can sample other tracks of the current album before deciding whether to purchase that album.

Where the current track is an advertisement, buy now button 326 can similarly be used to provide a link to a site through which the user can purchase the product or products being advertised. Similar to the music track, this can be a direct link to the supplier's page or pages that offer their particular product for sale, or to the company's home page such that the user can browse through and obtain information about the company and all of its products.

In one embodiment, virtual coupons can be implemented whereby an "on-line" coupon is offered to the listener. In this case, a button may be provided that enables a user to select a coupon. For example, a user may click on the select coupon button causing the coupon to be printed out on a printer associated with the listener's machine. Advertisers may use this virtual coupon as a device for offering special promotions to web-based listeners. Of course, coupons can present special deals and can have expiration dates and other features or aspects associated with conventional paper coupons.

A history window 306 can also be provided to display a history of tracks played by the radio station 204 or other program provider 104. In one embodiment, history window 306 is a sliding window that illustrates a predetermined or selectable number of the most recent tracks contained within the broadcast material. The history window, in one embodiment, is a chronological display of past tracks played. The display does not need to be chronological, however, this organization may represent a more user friendly interface. Where cut codes or other information pertaining to future tracks is available, the history bar may also be used to provide a look into upcoming programming.

The history window 306 can also include scroll buttons or a scroll bar such that the listener can scroll through the various selections in history window 306. History window 306 does not need to be limited to displaying a history of music tracks played, but can also display a history of advertising or other tracks included in the broadcast material. History window 306 can provide a means for a listener to easily go back and retrieve information on past tracks.

In one embodiment, the user simply clicks on one of the windows in the history bar to bring up the information for that selection. For example, in the embodiment illustrated in FIG. 7, history window 306 shows the five most recent tracks played. These are, in chronological order (oldest to most recent), the Beatles, a Sony advertisement, a McDonald's advertisement, a Sprint advertisement, and a Fleetwood Mac selection. In the embodiment illustrated, the Fleetwood Mac selection is the one that was most recently on air. If, for example, the listener wanted to obtain additional information about the Beatles selection that was being played, the user may simply click on the Beatles window and that information can be displayed on data window 302. In this case, live-air indicator 316 may change to show it is no longer a live selection.

However, with the history information pulled up, in one embodiment, the user can access all of the information that he or she could have accessed via the various buttons and selections when the selection was originally being played. Thus, even if the user did not take the opportunity to check on concert information or album information or to order an album when the song was originally played, the user can go back via the history bar and take the opportunity to do so at this time. In one embodiment, all that is saved is the program data for each item in the history window. Therefore, when the user makes a selection, the process of retrieving supplemental information for the selected item begins again from scratch.

Alternatively, any or all of the information previously retrieved when that track was initially played can be stored locally such that the information does not have to be re-retrieved when a history selection is made. Of course, depending on the amount of information retrieved and the storage space available, the number of selections for which material can be stored may vary. In one embodiment, the amount of information saved can be user selected. In the case of an advertisement that included a virtual coupon, for example, the user can still go back to that advertisement and obtain the coupon.

In one embodiment, the history bar is maintained only for selections or tracks that were played while the listener terminal 212 was actively receiving broadcast material. Alternatively, program data from previous tracks prior to the time that the user terminal 212 was "listening" to the broadcast can be downloaded such that the history bar can be filled in for earlier tracks. This application is particularly suited for the embodiment in which the program data is provided from the radio station 104 directly to data server 116. In this embodiment, the server can maintain a history and schedule of the tracks played by a particular broadcaster during a given time period. However, the invention is not limited to this embodiment as this history can be maintained by keeping track of the program data codes that are received from data terminals 212 in the embodiment illustrated in FIG. 5.

There are several advantages that are obtained by providing a history bar such as that illustrated in FIG. 7. One advantage is that the user can go back and retrieve information pertaining to a selection that he or she may otherwise have missed. Thus, the user is afforded the opportunity to take advantage of things that can easily be missed in real time broadcasts. For example, a user may be listening to broadcast material in a car on his or her way to the office. The user may hear a song that he or she likes or perhaps may even hear an advertisement of a product that he or she is interested in purchasing. However, as the listener is currently driving down the freeway, it is not practical to write down the information provided.

Additionally, the user may wish to take advantage of the features provided by the player and cannot do so while listening in the car. Therefore, when the listener reaches his or her destination, the listener can bring up the player, access the broadcast broadcast material, and go back through the history bar 306 to find the track in which he or she was interested. For example, if the user wishes to purchase an album or obtain additional information about an album or track that was played on the radio while he or she was in the car, the user can simply select that album from the history bar and can retrieve all of the informational pertaining to that album.

Additionally, the user can purchase the product through the use of buy now button 326. Thus, simply because the listener was in the car, the listener has not missed the opportunity to obtain additional information about the track or purchase the album. In the case of advertisements, the user may wish to purchase a product that he or she heard advertised while in the car, or take advantage of a coupon that was advertised for a product while he or she was in the car. Similarly, the user can access the history bar 306, go back to the particular advertisement, and retrieve the coupon or other information that the user desires. Thus, the user has not lost the opportunity to purchase a product or obtain savings related to a product, simply because he or she was listening to the radio station in the car.

Unless the listener's user terminal 212 was on and active during the time the track of interest was broadcast, the data codes have not been provided to user terminal 212. Therefore, when the user activates his or her player, the player will retrieve the data codes for the period of time in which the player was active. In embodiments where program data is provided on server 116 from provider 104, data codes for the history prior to the time at which the player was active is also available. Additionally, server 116 may be able to obtain a history for the user based on codes or data received from other listeners of the same program. Alternatively, broadcast Internet service provider 208 may maintain a history of the data codes such that they can be provided to the user terminal to access information pertaining to past codes prior to the time at which the player was active.

An additional advantage of a history bar 306 is that the advertiser's advertising impression is provided with "air time" greater than that provided with the advertising time slot. For example, an advertiser's commercial may air for 15 to 30 seconds on the radio within the broadcast material. However, once the advertiser's logo is placed on a button in history window 306, that logo can remain on the bar for the duration of the following several slots, depending on the size of the history window. For example, in the embodiment illustrated in FIG. 7, in which the history window displays 5 active buttons, an advertiser's logo would be visible to the listener during the advertiser's time slot and also during the subsequent 4 time slots. For example, if these subsequent four time slots are music tracks of approximately 3 minutes in length, the advertiser's logo is available or has "air time" for an additional 12 minutes above and beyond that which it would otherwise receive.

Also illustrated in FIG. 7 is an advertising window 308. Advertising window 308 can be included to provide additional advertising slots to be displayed to the listener. In one embodiment, advertising window 308 displays banner ads or other ads of products provided by advertisers. The banner ads or other advertising materials for display in advertising window 308 can also be retrieved in a manner similar to the retrieval of the other supplemental materials. Thus, the advertisements can be coordinated with or coded to particular tracks within the broadcast material. This has the advantage that the advertising can be geared to the particular listener expected to be listening to a track that is currently playing in the programming material. As such, the advertising material is more relevant and of greater interest to the listener which is advantageous to both the listener and the advertiser.

For example, when a Grateful Dead track is being played, banner ads related to items of interest to Grateful Dead listeners may be keyed for appearance in advertising window 308. The importance of this feature can be further illustrated by considering a typical listening scenario. Because most listeners tend to listen to broadcast material such as radio information in the background, it is anticipated that the majority of the time that the player is active, the player will be operating in the background mode on user terminal 212. For example, where the listener is at his or her office working on other applications on his or her user terminal, the player may be active in the background, providing background music to accompany the listener throughout his or her workday. However, when the listener comes upon a particular track that he or she has great interest in, that listener may bring the player window to the forefront. As such, it is during this time, that the advertising window 308 is visible to the listener. Therefore, keying the advertisements to the track in the broadcast material maximizes the benefit of the advertisement occurring in advertising window 308.

Advertising window 308 can also be coordinated with advertisement tracks being broadcast within the broadcast material. For example, advertising window 308 may advertise other related products, current specials in addition to what is being advertised on the radio, or other information or material that may be pertinent to be keyed with the advertising track. In one embodiment, it is even foreseeable that competitors' ads be placed in advertising window 308 such that competitors can have the chance to also compete in the marketplace. It should be noted however that it is foreseeable that agreements with the advertisers may restrict this practice from occurring. However, the capability exists within the system described herein.

Also provided on player interface 304 is a station list button 318. Station list button 318, when clicked, accesses a list of stations that are accessible by the player. Thus, if the listener wishes to change the station, the listener can click station list 318 and select a new station from among those listed. The list can include identifying information such as, for example, station name, frequency, format, and other information.

As the example described above with reference to FIGS. 5, 6 and 7 illustrates, the provision of supplemental materials coordinated with a stream of broadcast material can provide numerous features and advantages to the user and the providers. Again, it is stressed that the invention is not limited to the specific applications or examples described herein. For example, although the player of FIG. 7 was discussed in terms of the radio station example illustrated in FIGS. 5 and 6, such a player can be used with other architectures, including those architectures illustrated in FIGS. 1–4. Again, broadcast material is not limited to radio broadcast material, but can include other audio, video, or alternative format material.

One or two alternatives are briefly described such that it can be seen how they would fit within the invention described herein. For example, consider a situation where the broadcast material being delivered is television programming. Television programming can be thought of as being formatted similar to the radio broadcast in that it includes tracks of the television program as well as advertising tracks and promotional slots. Similar to the radio example, these tracks in video material can be coded such that supplemental information can be retrieved for the coded tracks. This information can be keyed to and coordinated with the tracks such that the benefit derived from the information is maximized. Information can include information such as the series or program being displayed, actors or actresses associated with the series, perhaps even products that are viewed in camera on the series that a user may wish to investigate more fully.

For example, where the broadcast material is a television show, the actors on a television show may be driving a particular automobile, using a particular brand of coffee, or otherwise using a specific consumer-related product. It is foreseeable then that supplemental information relating to this broadcast material can be coded into the program data such that this supplemental information can be retrieved in conjunction with the viewing of the broadcast material. For example, windows adjacent to the viewing window can provide the user with selections to view supplemental information pertaining to one or more products. Thus, with the click of one of these buttons, the user can obtain this additional information which again can include product specifications, ordering information, shipping and delivery information, as well as a host of other informational items that may be associated with the particular product.

As another example, consider the case in which the broadcast material is a class lecture being delivered by a professor to user equipment 112. The broadcast material may be divided into segments analogous to the tracks, and these segments can have codes associated therewith analogous to the program data. Where this format can also be useful for keying specific supplemental information to specific segments such as, for example, complete solutions to problems being solved in the class, supplemental texts or treatises relating to the subject matter of the segment, homework assignments for the next class, class syllabus or schedule information, and any other informational materials that may be relevant to a segment or class.

As the few examples illustrate, the application of the invention is seemingly limitless in that there are numerous different types of broadcast material and associated supplemental information that can be coordinated in this manner.

Figure 8:
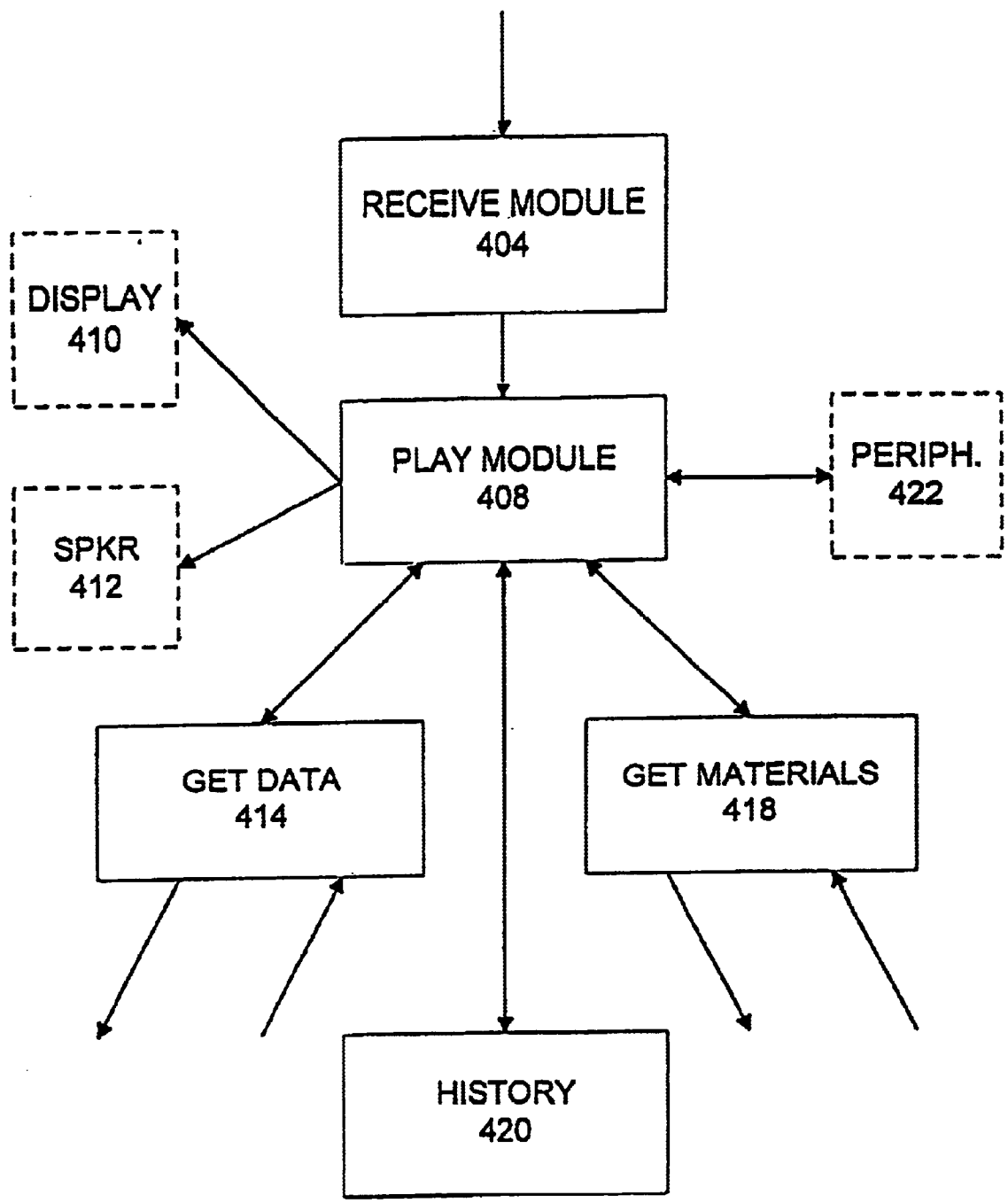
FIG. 8 is a diagram illustrating an example functional architecture for a player according to one embodiment of the invention.

A number of different architectures and configurations can be used to implement a player such as, for example, the player described above. FIG. 8 is a block diagram illustrating the functionality of an example player according to one embodiment of the invention. The player, according to this embodiment, includes several modules for receiving materials, coordinating materials, and playing the materials via the player. These modules are now described according to this example embodiment. After reading this description, it will become apparent to one of ordinary skill in the art how one or more players can be implemented using this or alternative functional architectures. A received broadcast module 404 is configured to receive the broadcast from the broadcast material broadcast provider. As discussed above, in one embodiment, this broadcast is received via the Internet from an Internet broadcast provider.

A play broadcast module 408 is configured to receive the broadcast material from received module 404 and configure the broadcast material for playback via the player. In one embodiment, the broadcast material can be provided to a display screen 410, a speaker 412, as well as other peripheral devices 422. A get-data module 414 can be included to utilize the program data to retrieve information pertaining to the supplemental materials. In one embodiment, as discussed above, this information retrieved is locational or other parameters pertaining to the supplemental data that can provide an indication to the user equipment regarding where to locate the supplemental materials. In alternative embodiments, get-data module 414 can access a server to directly obtain these supplemental materials based on the program data.

A get-materials module 418 can be utilized to use the parameters retrieved by get-data module 414 to subsequently receive the broadcast materials from one or more servers. The get-materials module 418 can provide the retrieved materials to the play broadcast module 408 such that these supplemental materials can be displayed or otherwise played along with the broadcast material on the various peripheral devices.

Also illustrated in FIG. 8 is a history module 420 that can be used to coordinate the archival or storage of particular pieces of information to maintain a history window, as discussed in further detail below. In one embodiment, history module 420 stores the program data received by received module 404 such that this program data can be used to allow the user to go back and retrieve broadcast materials pertaining to a particular segment of the broadcast program. The history module 420 can be used to store program data, as well as, in one embodiment, supplemental materials that may already have been retrieved for a particular program segment.

Figure 9:
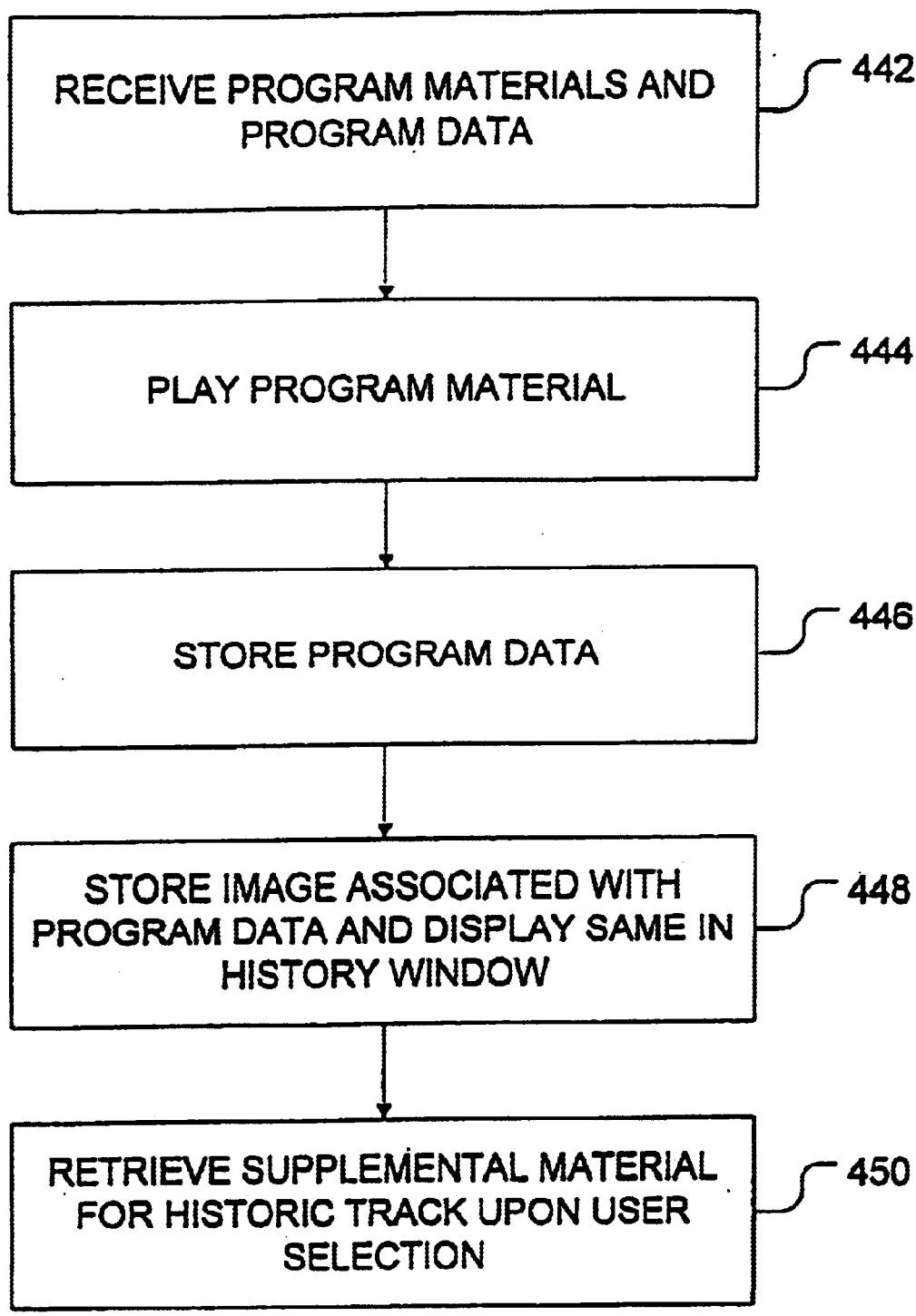
FIG. 9 is an operational flow diagram illustrating a process for implementing a history window according to one embodiment of the invention.

FIG. 9 is a block diagram illustrating one process by which a history window 306 can retrieve information pertaining to the history of the broadcast material. Referring now to FIG. 9, in a step 442, the player receives the broadcast material and program data from a broadcaster. In a step 444, the broadcast material is played to the user while the program data is used to access supplemental information. In a step 446, the program data for each segment is stored in local storage such that it can be recalled by the history window for later use.

Also stored, in a step 448, is an image associated with the program data. This image is displayed as part of the history window. Associated with the displayed image is an identification of the program data or other information that can be used to identify the particular history item. In response to a user selection of a particular item of the history window, the history module retrieves supplemental materials associated with the selected track, and plays these materials to the user. In one embodiment, only the program data is stored for each track, and the history module needs to do a retrieval of supplemental materials associated with that track.

In an alternative embodiment, some or all of the supplemental materials previously retrieved for that track can be stored locally and associated with the item in the history window. In this alternative, these items do not need to be retrieved, and can be more immediately played to the user.

Figure 10:
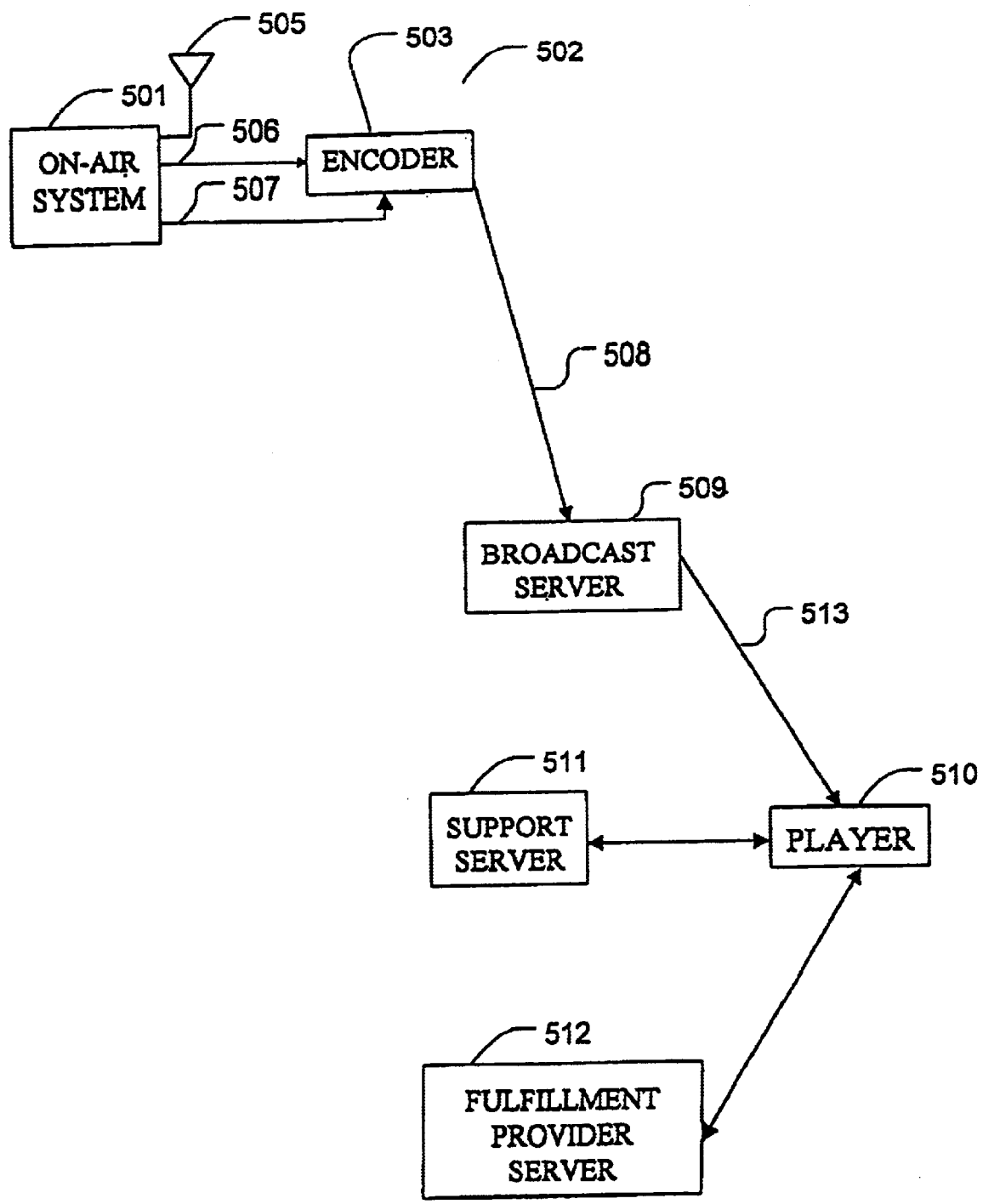
FIG. 10 is a diagram illustrating an example implementation of an architecture for providing supplemental materials with broadcast material.
Figure 11:
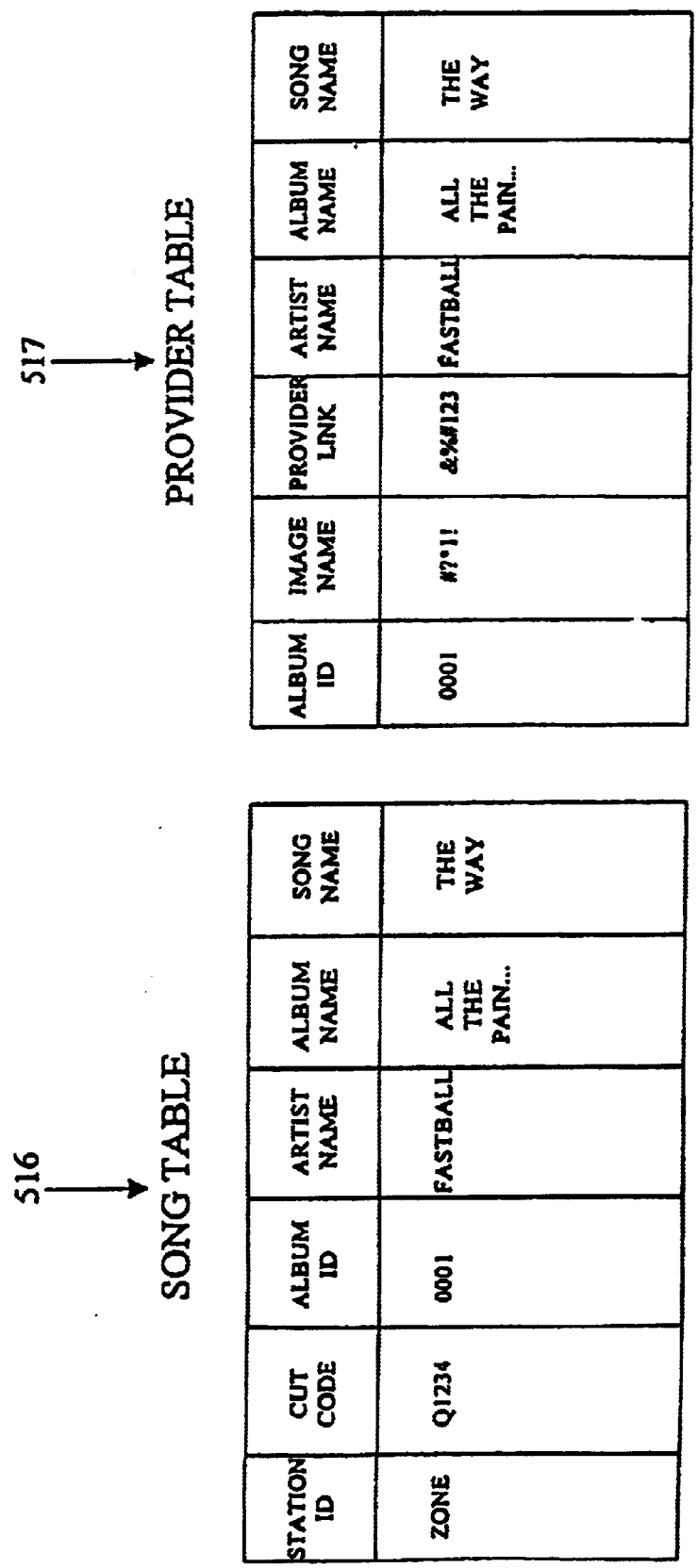
FIG. 11 is a diagram illustrating an example song table and provider table according to one embodiment of the invention.

A more specific example implementation is now described with reference to FIGS. 10–12. As illustrated, in this example, on-air system 501 of the type typically employed by a broadcaster such as a radio station or the like broadcasts a predetermined audio stream comprising a predetermined sequence of songs interspersed with one or more audio advertisements. In one example, the on-air system is a commercially available system such as ENCO or Prophet commonly used by radio stations and the like. The on-air system transmits this audio information over the airwaves through antenna 505, and also provides it in digital form over signal line 506 to encoder 503. Concurrently, the on-air system also provides over signal line 507 data in the form of identifying indicia or codes such as cut codes. The codes are indicators of the audio information concurrently being transmitted over signal line 506. Advantageously, each song or advertisement comprising the audio information being concurrently transmitted over signal line 506 comprises a distinct segment. A cut code corresponding to and uniquely identifying a segment from the standpoint of the radio station is transmitted over signal line 507 concurrently with the transmission of the corresponding segment over signal line 506.

Encoder 503 is configured to compress the audio information received over signal line 506. Advantageously, the encoder can be implemented using a commercially available encoding scheme such as, for example, the "Active Streaming Format" from Microsoft Netshow, or the "SureStream" G2 encoding scheme from Real. Advantageously, the encoder 503 is part of a coordinating encoder 502 configured to merge the cut codes provided over signal line 507 with the audio information provided over signal line 506 to provide a merged data stream over signal line 508. The encoder 503 under the control of the coordinating encoder 502 performs this merging procedure. Advantageously, in this procedure, a cut code is inserted into the merged stream throughout the audio segment it identifies. In one embodiment, Radowave.com, the assignee of the subject application, provides the coordinating encoder 502.

The audio information transmitted from antenna 505 is advantageously received by one or more traditional RF receivers (not shown) configured in the form of radios and the like. This process is known to those of ordinary skill in the art, and need not be described further.

Meanwhile, the merged stream is provided over signal line 508 to one or more broadcast servers 509. In one variant, the transmission of the merged data to the broadcast servers is accomplished through a wireless interface rather than a signal line. Advantageously, in one embodiment, the servers are provided by broadcast.com, of Dallas, Tex., www.broadcast.com, and are configured to simply broadcast the merged stream over a communications network such as the Internet.

A player 510 is provided which executes on a client computer or other end user device within the communications network. Alternatively, the player is a web-based player resident on a server in the network, but accessible through the client machine. The player is configured to receive the merged stream over signal line 513 and play the audio component thereof through speakers or the like (not shown) configured as part of the client computer/end user device. In addition, the player is advantageously associated with the radio station or other broadcaster associated with on-air system 501, such that the identity of the radio station or other broadcaster is known to the player.

The player is also configured to detect the presence of a cut code in the merged stream, and responsive to detecting the presence of a cut code identifying a song, signal another server on the network identified with numeral 511. (The response of the player to detecting the presence of a cut code identifying an advertisement is detailed in the next section). In one embodiment, upon detecting a cut code identifying a song, the player is configured to provide server 511 with the identity of radio station 501, as well as the cut code that has been detected.

Advantageously, in one embodiment, server 511 is provided by RadioWave.com, the assignee of the subject application. Responsive to the receipt of a station ID and a cut code identifying a song, the server 511 accesses one or more tables. With reference to FIG. 11, the server 511 first accesses a song table 516, the entries of which correlate a station ID and cut code with an ID of the album containing the song, the name of the artist, the album name, and the song name. Through this step, the server 511 obtains the album ID for the album containing the song associated with the cut code and station ID that was previously sent to the server.

Next, the server 511 accesses a provider table 517. As can be seen, the entries of this table correlate the album ID with (1) a name of an image related to the cut or segment, such as but not limited to a gif image of the cover of the album or tape containing the song; (2) a provider link, i.e., a URL or other link to additional information related to the song or album, such as a link to a server 512 of a fulfillment provider; (3) the artist name; (4) album name; and (5) song name. In one example, by accessing this table, the server 511 obtains the name of an image file of the album or tape cover containing the song, the artist name, the album name, the song name, and the record label. In one implementation, the fulfillment provider server is that of Amazon, Inc. at www.amazon.com, and the link to this server is a URL link known as an ASIN#. In one embodiment, server 511 obtains the actual image for the album cover, which is either stored locally or on another server accessible from server 511, and then provides the image, song name, artist name, and album name to player 510. In another embodiment, server 511 provides the player 510 with a link to the image stored on another server, and, responsive to this information, the player 510 obtains the actual image for the album cover, or other related image, from fulfillment provider server 512.

In the event that there is not an entry in the provider table 517 for the album ID obtained from the song table 516, the artist name, album name, and song name are obtained from the song table 516. That is the reason why entries for this information are redundantly provided in both the song table 516 and provider table 517. In this event, song name, artist name, and album name are provided to the player 510, but the provider link is omitted.

Responsive to the receipt of the artist name, album name, song name, image, and provider link (this last item of information being provided only in the case in which there is an entry for the album in the provider table) are then provided to the player 510. Upon receiving this information, the player displays it through a suitable display.

Figure 12:
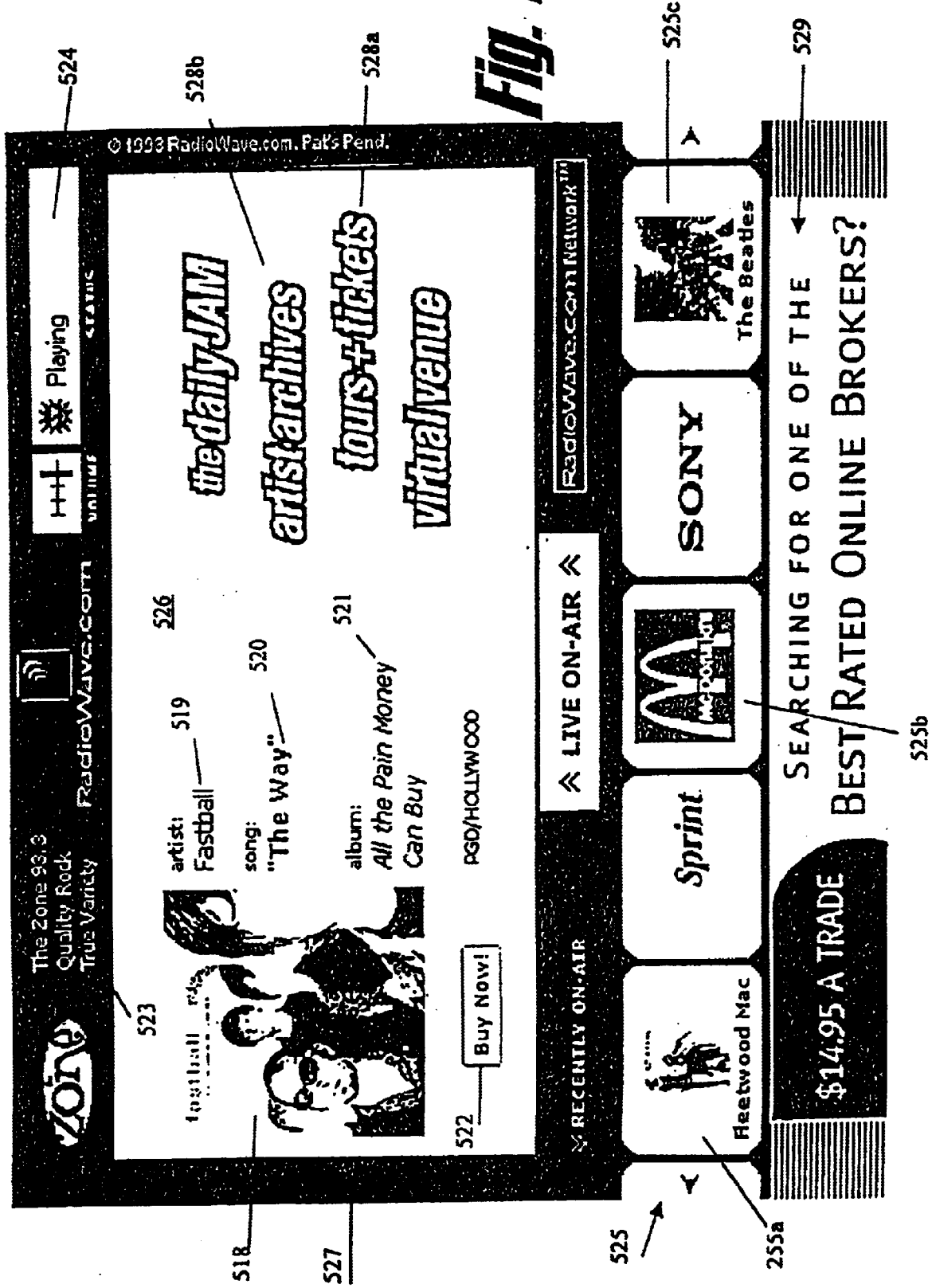
FIG. 12 is a diagram illustrating an example player according to one embodiment of the invention.

With reference to FIG. 12, an example of such a display is illustrated. As can be seen, the display includes a web-based component 526 in which is displayed the image 518 of the album cover for the song that is currently being played, the name 519 of the artist of the song, the name 520 of the song, and the name 521 of the album in which the song is contained. In addition, around the web-based display component is a border 527, which is advantageously stored locally on the client machine. Displayed within or at the border 527 is an identifier 523 for the radio station 501 from which the audio information being broadcast originates, and an indicator 524 of the quality of the signal, and the elapsed listening time.

In one embodiment, a history component 525 is displayed below the web-based component. This component contains information about the audio segments that have been played by the player in the recent past. In the illustrated embodiment, the history information is displayed with the most recent information beginning at the left, and the less recent information being arranged towards the right. As can be seen, the information is displayed is the image associated with the segment. Also, images can be displayed both for songs and advertisements that have aired. Starting from the left, it can be seen that an image 525a from a Fleetwood Mac album cover is displayed, indicating that a song from this album was most recently played. This is followed by images for advertisements, which have aired, from Sprint, McDonalds, and Sony. The image for the McDonalds advertisement is identified with numeral 525b. Next, image 525c for a Beatles album cover is displayed, indicating that a song from this album was played. As audio information is played, this history information is updated.

A "buy now" button 522 is also displayed. When a user clicks on this button 522, with reference to FIG. 10, a link is established to a program resident on fulfillment provider server 512 using the provider link provided by the server 511. As discussed, in one example, the fulfillment provider server 512 is www.amazon.com, and the provider link is an ASIN# which is a URL link to this server. Once this link is established, in one embodiment, a browser is launched allowing a user to peruse information resident on server 511 and purchase the album containing the song being played or related albums. Alternatively, the user is allowed access to this information through a feature window displayed by the player. In one example, the link to server 512 is established simply by appending the provider link to the URL of the server 512. In this example, it is assumed that the URL of the server 512 is known to the player 510, but it should be appreciated that examples are possible in which this URL information is provided to player 510 by server 511.

It should be appreciated that examples are possible in which server 511 provides other links associated with the song being played to the player 510. One such example is a URL or other link to information describing the concert tour schedule of the artist of the song being aired, and a program allowing the user to purchase tickets to one of these concerts. With reference to FIG. 12, when a user clicks on a "tours and tickets" identifier 528a, the link to this information can be established, and a browser launched or other mechanism such as a feature window initiated allowing the user to peruse this information.

Another example is a URL or other link to information describing other albums by the artist of the song currently being played. Again with reference to FIG. 12, when a user clicks on an "artist archives" identifier 528b, the link to this information can be established, and a browser launched or other mechanism initiated, such as a feature window, allowing the user to peruse this information.

A third example is a URL or other link to information about a product or service being advertised. According to this example, an advertisement regarding a product or service is displayed within web-based component 526. When a user clicks on this information, a URL or other link can be established to a server configured to provide additional information about this product or service, and a browser launched or other mechanism initiated, such as a feature window, to allow a user to peruse this information.

The above specific example is provided by way of example only, and it should be appreciated that other environments are possible allowing beneficial employment of the subject invention, including the more generic examples described above.

Figure 13:
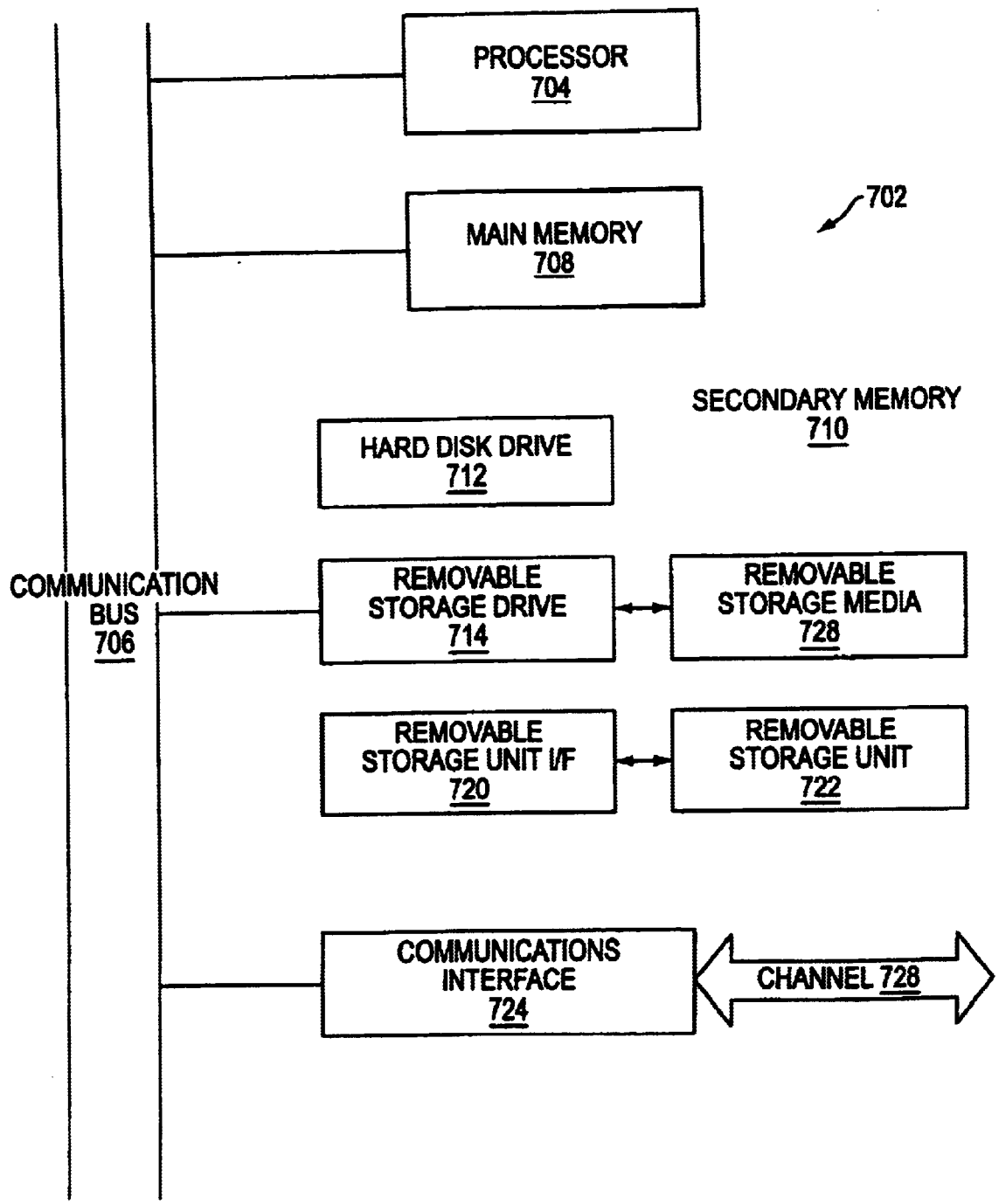
FIG. 13 is a diagram illustrating an example computer architecture according to one embodiment of the invention.

The various embodiments, systems and subsystems of the invention described above may be implemented using hardware, software or a combination thereof and may be implemented in one or more computer systems or other processing systems. In fact, in one embodiment, these elements are implemented using a computer system capable of carrying out the functionality described with respect thereto. An example computer system 702 is shown in and described with respect to FIG. 13. The computer system 702 illustrated in FIG. 13 includes one or more processors, such as processor 704. The processor 704 is connected to a communication bus 706. Various software embodiments are described in terms of this example computer system. After reading this description, it will become apparent to a person skilled in the relevant art how to implement the invention using other computer or processor systems and/or architectures. The functionality of the invention as described above is not dependent on a particular computer or processor architecture.

Computer system 702 can include a main memory 708, preferably random access memory (RAM), and can also include a secondary memory 710. The secondary memory 710 can include, for example, a hard disk drive 712 and/or a removable storage drive 714, representing a floppy disk drive, a magnetic tape drive, an optical disk drive, etc. The removable storage drive 714 reads from and/or writes to a removable storage medium 718 in a well known manner. Removable storage media 718, represents a floppy disk, magnetic tape, optical disk, etc. which is read by and written to by removable storage drive 714. As will be appreciated, the removable storage media 718 includes a computer usable storage medium having stored therein computer software and/or data.

In alternative embodiments, secondary memory 710 may include other similar means for allowing computer programs or other instructions to be loaded into computer system 702. Such means can include, for example, a removable storage unit 722 and an interface 720. Examples of such can include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 718 to computer system 702.

Computer system 702 can also include a communications interface 724. Communications interface 724 allows software and data to be transferred between computer system 702 and external devices. Examples of communications interface 724 can include a modem, a network interface (such as, for example, an Ethernet card), a communications port, a PCMCIA slot and card, etc. Software and data transferred via communications interface 724 are in the form of signals which can be electronic, electromagnetic, optical or other signals capable of being received by communications interface 724. These signals are provided to communications interface via a channel 728. This channel 728 carries signals and can be implemented using a wireless medium, wire or cable, fiber optics, or other communications medium. Some examples of a channel can include a phone line, a cellular phone link, an RF link, a network interface, and other communications channels.

In this document, the terms "computer program medium" and "computer usable medium" are used to generally refer to media such as removable storage device 718, a disk capable of installation in disk drive 712, and signals on channel 728. These computer program products are means for providing software or program instructions to computer system 702.

Computer programs (also called computer control logic) are stored in main memory and/or secondary memory 710. Computer programs can also be received via communications interface 724. Such computer programs, when executed, enable the computer system 702 to perform the features of the present invention as discussed herein. In particular, the computer programs, when executed, enable the processor 704 to perform the features of the present invention. Accordingly, such computer programs represent controllers of the computer system 702.

In an embodiment where the elements are implemented using software, the software may be stored in, or transmitted via, a computer program product and loaded into computer system 702 using removable storage drive 714, hard drive 712 or communications interface 724. The control logic (software), when executed by the processor 704, causes the processor 704 to perform the functions of the invention as described herein.

In another embodiment, the elements are implemented primarily in hardware using, for example, hardware components such as PALs, application specific integrated circuits (ASICs) or other hardware components. Implementation of a hardware state machine so as to perform the functions described herein will be apparent to persons skilled in the relevant art(s). In yet another embodiment, elements are implemented using a combination of both hardware and software.

Figure 14:
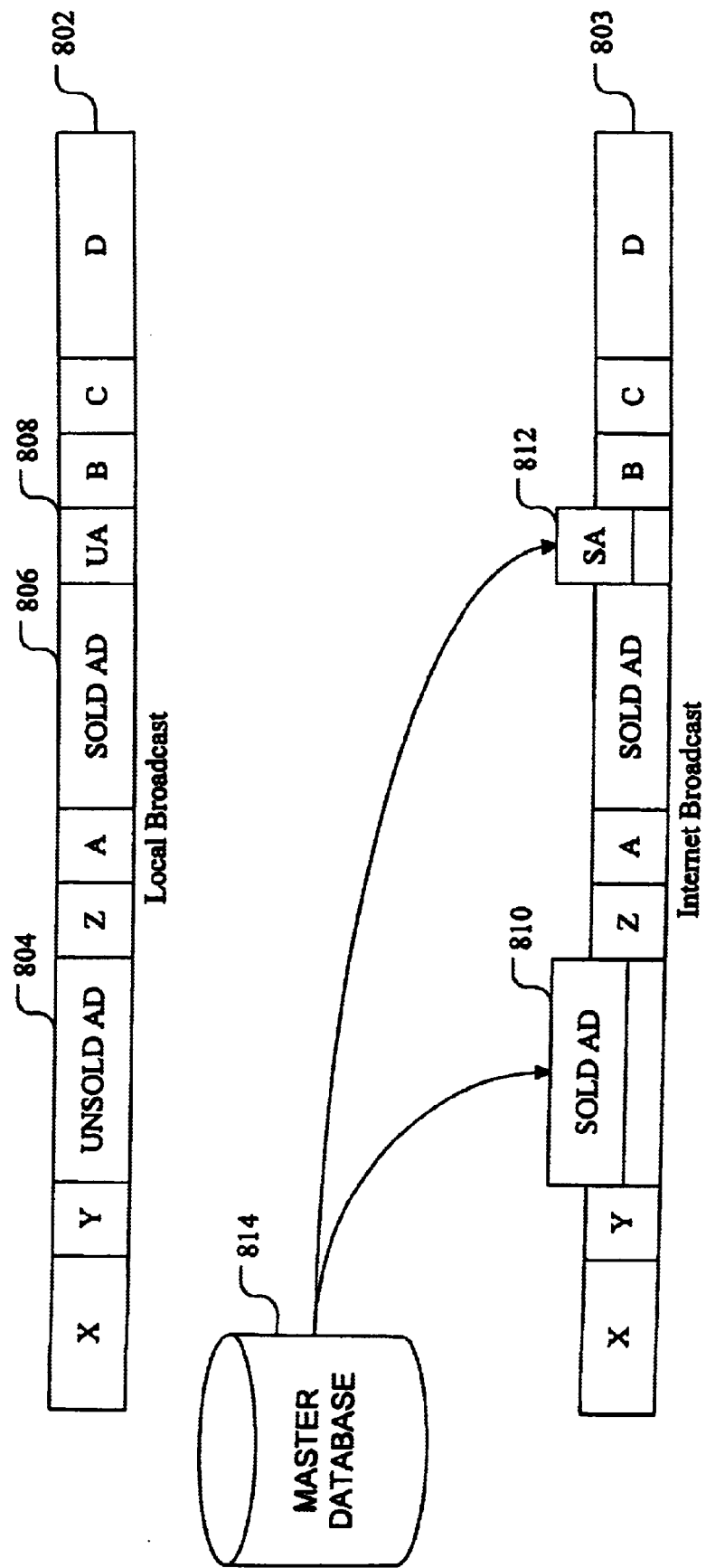
FIG. 14 is a block diagram that is useful for describing the advertisement insertion system and method in accordance with a an embodiment of the present invention.

FIG. 14 is a block diagram that is useful for describing the advertisement insertion system and method in accordance with a preferred embodiment of the present invention.

It is important to note that the present invention can insert or substitute any segment with any other segment. A segment can include, for example, music, DJ voice or introduction segments, promotional segments, news segments, advertisement segments and any other segment that a station my wish to broadcast as part of its broadcast material.

It is important to note that for simplicity, and to describe a preferred embodiment of the present invention, the present invention is described in terms of substituting "unsold" advertisements with "sold" advertisements. However, the present invention can be used to insert or substitute any segment with any other segment. A segment can include, for example, music, DJ voice or introduction segments, promotional segments, news segments, advertisement segments and any other segment that, for example, a radio station my wish to broadcast as part of its broadcast material.

Thus, the use of advertisement segments to describe a preferred embodiment of the present invention should not be construed to limit the scope and breadth of the present invention, which is defined in accordance with the claims listed below, and their equivalents.

A local, on-air audio broadcast stream is represented by the top set of rectangles 802. A widely distributed Internet broadcast stream of the same material, (with two substituted/inserted advertisements), is represented by the lower set of rectangles 803. When materials are broadcast over a widely distributed network, such as the Internet, it is referred to herein as being broadcast to or for the "global market".

It should be noted that an on-air broadcast system is used to describe a preferred embodiment of the present invention. However, such a system is not essential to an embodiment of the present invention. For example, the present invention can be implemented without a "live" or "on-air system". In one embodiment, an Internet-based broadcast of a pre-recorded program is used. Thus, the live or on-air system is replaced with a pre-recorded program. Consequently, the use of the on-air system in the examples below should not be construed to limit the scope and breadth of the present invention.

As shown, the on-air broadcast stream comprises a plurality of segments, wherein each segment has a predetermined length of time, as indicated by the width of each rectangle. Thus, as shown, the on-air stream 902 comprises a plurality of segments labeled X, Y, Z, A, B, C and D. These segments may include, for example, music, DJ voice or introduction segments, promotional segments, news segments, and any other segment that a station my wish to broadcast as part of its broadcast material.

The other segments shown in this example are advertising segments or ads. For example, the ad segment 804 represents an unsold advertisement segment. The ad segment 806 represents a sold advertisement segment, and the segment 808 represents a second unsold advertisement segment.

In this example, unsold advertisements refers to an ad that has only been sold for the local "on-air" market and has not been sold for the global market. The unsold ad is of the type that is a candidate for substitution in accordance with one embodiment of the present invention.

Similarly, a sold ad is one that has been sold for the global market. When a sold ad is in the local broadcast stream, it is not a candidate for substitution in accordance with one embodiment of the present invention. Accordingly, in order provide increased value to advertisers, radio stations, and consumers, it is desirable to replace unsold ads with sold ads, when transmitting the local broadcast stream to the global market.

Accordingly, as shown, the unsold ad 804 is replaced with a sold ad 810. The sold ad is selected from an inventory of sold ads in the master database 814. Note that the duration of the inserted ad 810 is substantially similar to the duration of the replaced ad 804. Similarly, the second unsold ad 808 is replaced with a second sold ad 812 of the same or substantially similar duration. The sold ad 812 is selected from the master database 814 in accordance with the principles described below.

Figure 15:
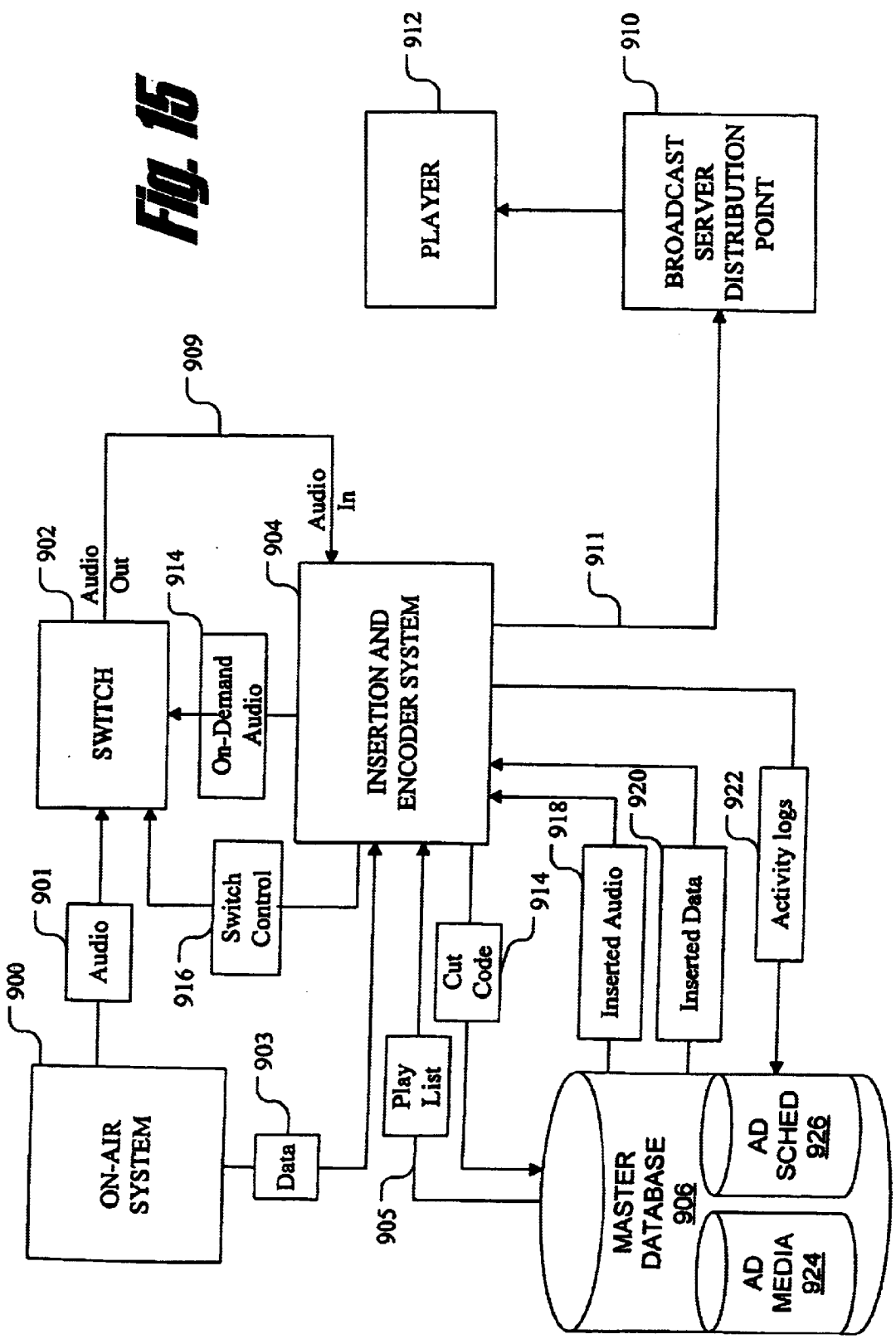
FIG. 15 is a block diagram depicting an example embodiment of the present invention.

FIG. 15 is a block diagram depicting an example embodiment of the present invention. An on-air system 900 of the type typically employed by a broadcaster, such as a radio station or the like, broadcasts a predetermined audio stream typically comprising a predetermined sequence of songs interspersed with one or more audio advertisements.

In this example embodiment, the on-air system 900 typically transmits audio information over the airwaves, although in other embodiments, this is not necessary. Simultaneously, the on-air system 900 transmits the audio information, in analog format, over the signal line 901 to a switch 902. Concurrently, the on-air system 900 provides data over the signal line 903 comprising identifying indicia or codes such as cut codes, to the insertion and encoder system 904. As described above, these codes are indicators of the audio information, such as advertisements, that are concurrently being transmitted over the signal line 901. These cut codes can be used to provide coordinated and supplemental material to users, as described above.

The insertion and encoder system 904 includes logic to determine whether to allow the on-air advertisements to pass through to the distribution point 910, or whether to substitute them for different advertisements or other material from the master database 906. An example of a process that can be used to implement this logic is subsequently described herein with reference to FIGS. 21 and 22.

If the insertion and encoder system 904 determines that the on-air advertisement should be passed through to the distribution point 910, a control signal 916 is sent to the switch 902 to connect the audio signal 901 from the on-air system to the switch output 902. If the insertion and encoder system 904 determines that the on-air advertisement should be replaced with an inserted advertisement (or other material), a control signal 916 is sent to the switch 902 to switch the output to the on-demand audio signal 914 coming from the insertion and encoder system 904. As shown, the output from the switch 902 is fed back into the insertion and encoder system 904.

It should be noted that in this example embodiment, the on-air system 900 and switch 902 are located on-site at a radio station. In addition, in one embodiment, the insertion and encoder system 904 and the switch 902 are located in a centralized location that is remote from the radio station 900. Thus the connections to the centralized insertion and encoder system 904 (i.e. the data connection 903 and audio connection 901) are typically implemented using a wide area network (WAN) or the like. Similarly, in this embodiment, the master database 906, comprising ad schedule data 926 (also referred to as "playlists") and ad media 924, is typically local to the centralized insertion and encoder system 904.

It is important to note, however, that in other embodiments, these components are located in different areas. For example, copies of the master database can be located in the radio station. In one embodiment, copies of the master database are located in the player. Many different configurations are possible. As such, the examples presented herein should not be construed to limit the scope and breadth of the present invention. Some example embodiments describing different configurations are presented below with reference to FIGS. 23 and 24.

As part of the logic described subsequently herein, the insertion and encoder system 904 needs to determine specific information about the advertisements being transmitted by the on-air system 900 for deciding whether they should be replaced. This is accomplished by continuously monitoring the data line 903 from the on-air system 900. As stated, the data line 903 preferably contains a cut code that identifies, among other things, the advertisement being played by the on-air system 900. As shown, this cut code 914 is used by the insertion and encoder system 904 to query the master database 906 for a play list 905 associated with the segment.

The play list 905 includes information about the advertisement being played that enables the insertion and encoder system 904 to determine whether the ad should be replaced. The play list also contains scheduling information for selecting replacement ads. The play lists are stored in the ad schedule data store 926 and include, for example, schedule information, whether the ad has been sold for the global market, whether the ad is coordinated with supplemental material, and other data such as the duration, etc.

If the insertion and encoder system 904 determines that the ad is to be replaced, the system 904 must next determine which ad to insert in the slot. The criteria for determining which ad to select from the master database 906, varies widely with each specific implementation of the present invention. An example procedure that can be used to select appropriate inserted advertisements is described below with reference to FIGS. 21 and 22.

Assuming that a particular advertisement has been selected in accordance with specific criteria, the insertion and encoder system 904 retrieves the inserted advertisement from the database 906, specifically, the ad media store 924. Accordingly, inserted audio 918 and inserted data 920 signals are sent from the database 906 to the insertion and encoder system 904.

The inserted ad audio signal 918 is the audio portion of the inserted advertisement and is analogous to the audio signal 901 sent by the on-air system 900. Similarly, the inserted ad data signal 920 is the data portion of the inserted advertisement and is analogous to the data signal 903 sent by the on-air system 900.

As shown, when an ad is to be inserted, the audio portion of the inserted ad (referred to as the on-demand audio signal 914), is sent to the input of the audio switch 902. As described above, the insertion and encoder system 904 also sends a control signal via the control line 916 to the switch 902 to send the on-demand audio signal 914 to the output 909 of the switch 902. This signal is then fed back into the insertion and encoder system 904, as shown.

The encoder portion of the insertion and encoder system 904 functions in a similar fashion as the encoder 503 described above. In particular, the encoder may be configured to compress the audio information. The primary purpose of the encoder, however, is to merge the data portion 903 or 920 with audio information 901 or 914 to provide a merged data stream to the distribution point 910. Accordingly, when an advertisement is being replaced, the on-demand audio signal from the switch output 909 is merged with the on-demand data signal 920. When an advertisement is not being replaced, the on-air audio data 901 is merged with the on-air data signal 903. The merged signal is transmitted to the distribution point 910, for distribution over the Intenet.

The master database 906 comprises two primary components, namely an ad media data store 924 and an ad playlist data store 926. The ad media data store 924 comprises an inventory of ad media, including the data portion for coordinated ads. This inventory comprises advertisements that have been sold for distribution to the global market.

The ad playlist data store 926 comprises information about each ad including the scheduling information, and target audience information. In addition, ads that are being broadcast by the on-air system have corresponding playlist data in ad schedule data store 926. This information is used by the insertion and encoder system to determine whether the ad should be substituted.

The insertion and encoder system 904 also maintains information about which ads have been played and which ads have been substituted. In this example, the master database 906 is also used to store this information. In other embodiments, different data stores are used. As shown, an activity log 922 is maintained by the insertion and encoder system 904. Information in the activity log is used for billing purposes, future scheduling and the like.

Figure 16:
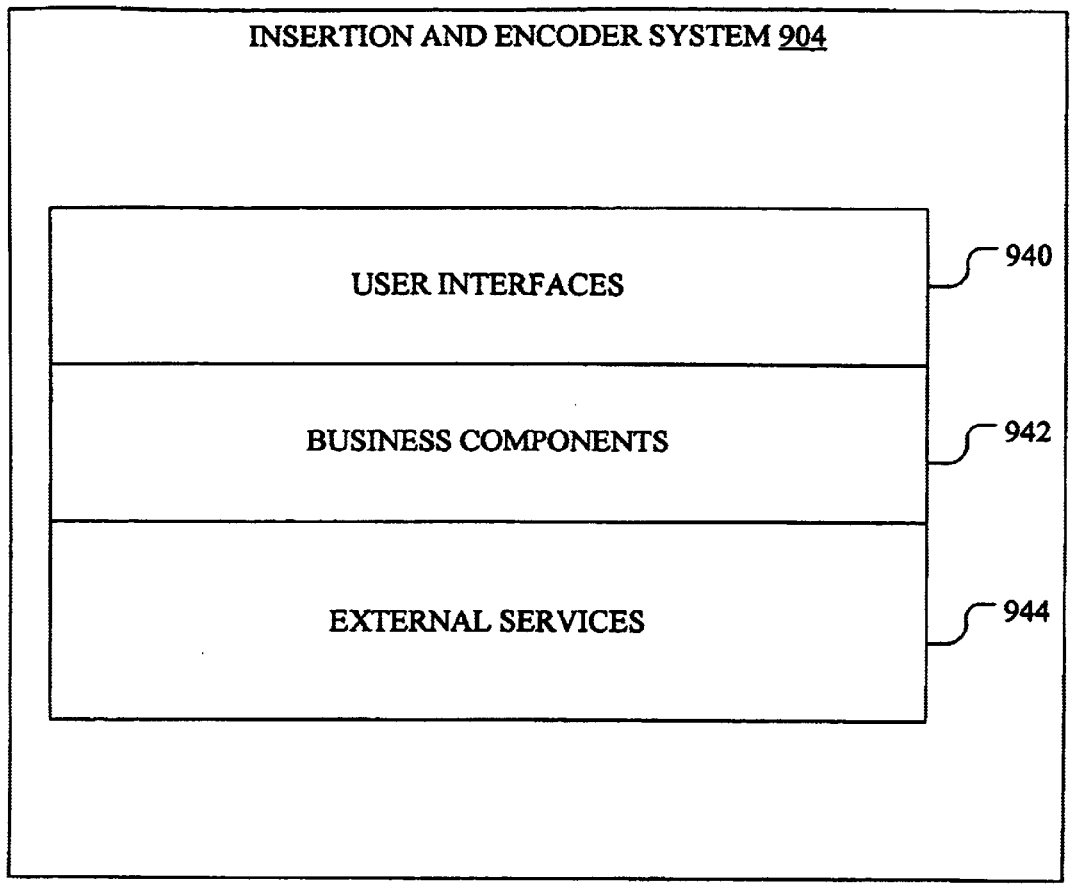
FIG. 16 is a block diagram depicting primary components of the insertion and encoder system in accordance with an embodiment of the present invention.

FIG. 16 is a block diagram depicting primary components of the insertion and encoder system 904, in accordance with an embodiment of the present invention. The insertion and encoder system 904 comprises a user interface module 940, a business components module 942 and an external services module. Details of each module are described below.

Figure 17:
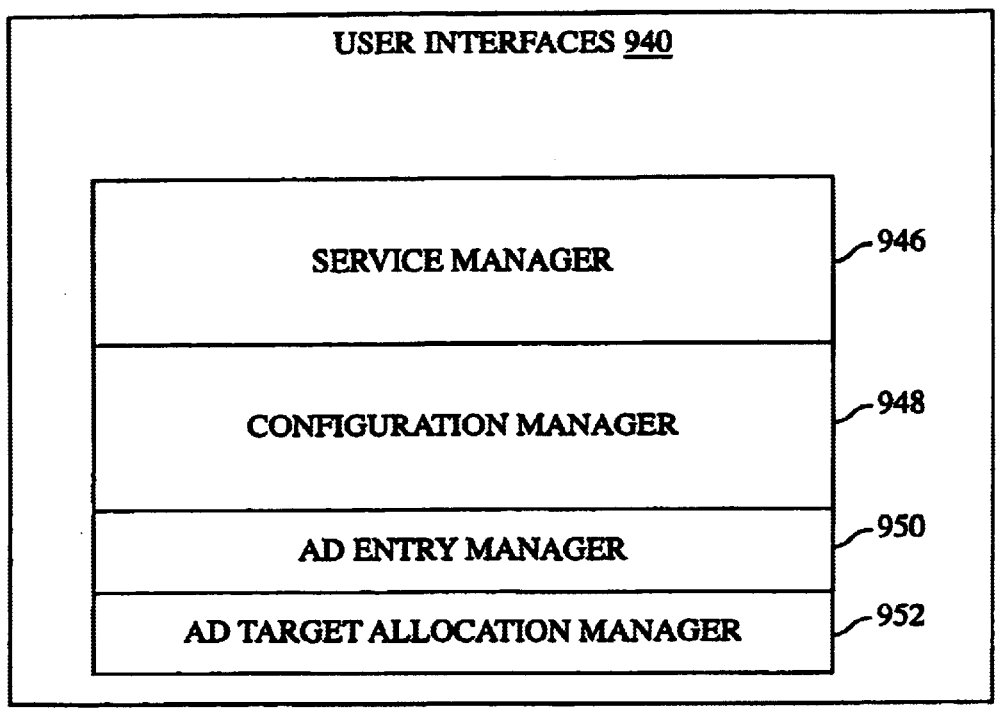
FIG. 17 is a block diagram depicting primary components of the user interface module in accordance with one embodiment of the present invention.

FIG. 17 is a block diagram depicting primary components of the user interface module 940, in accordance with one embodiment of the present invention. The user interface module 940 comprises a service manager 946, a configuration manager 948, an ad entry manager 950 and an ad target allocation manager 952. Details of these components are presented below.

The service manager 946 is the primary component responsible for coordinating the audio/data source for encoding with the processing of retrievals, insertions and playback. In one embodiment, the service manager module is used to delegate functions to other components. In a typical embodiment, these delegations are as follows.

Processing audio/data source is preferably delegated to a source monitor component 971 as described below.

Processing playback is preferably delegated to a demand player component 976 as described below.

Processing ad retrievals is preferably delegated to a schedule data source component 986, as described below.

Recording detailed activity logging is preferably delegated to an activity log component 988, as described below.

Processing insertions and encoding is preferably handled by the service manager 946 in conjunction with the encoder 503 as described above.

The configuration manager 948 is preferably responsible for providing necessary user interfaces for configuring all processes and services at run-time. This provides for customization per installation as necessary.

Figure 18:
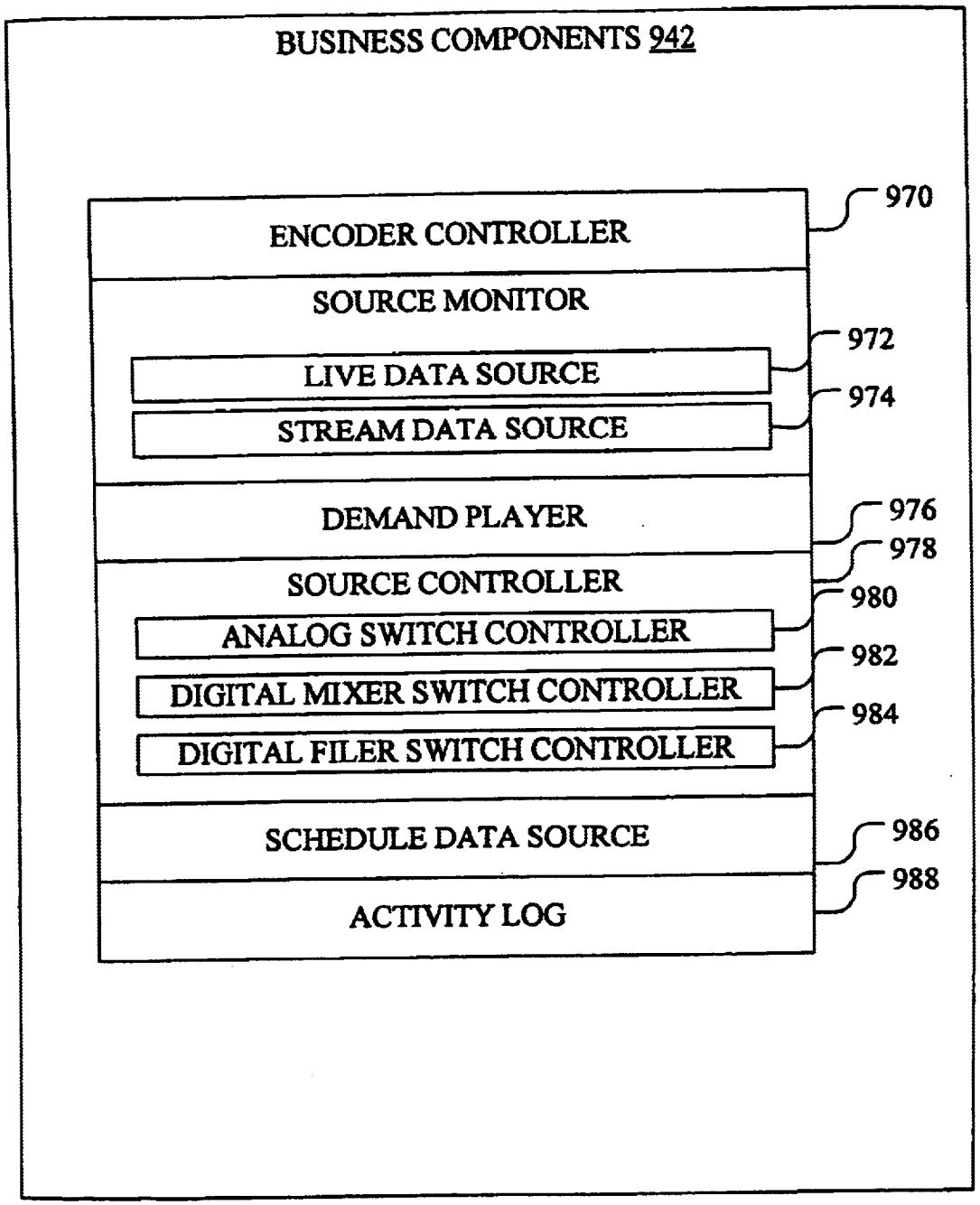
FIG. 18 is a block diagram depicting typical modules comprising the business components module in accordance with an embodiment of the present invention.

FIG. 18 is a block diagram depicting typical modules comprising the business components module 942, in accordance with an embodiment of the present invention.

In this example, the encoder controller 970 is responsible for automating and managing audio and data encoding. In particular, the encoder controller 970 is typically configured to compress the audio information and merge the data portion with audio information to provide a merged data stream to the distribution point 910. Accordingly, when an advertisement is being replaced, the on-demand audio signal 914 from the switch output 909 is merged with the inserted data signal 920. When an advertisement is not being replaced, the on-air audio data 901 from the switch output 909 is merged with the on-air data signal 903. The merged signal is transmitted to the distribution point 910.

The source monitor 971 is responsible for monitoring the audio/data source for encoding. The source monitor allows for the audio/data source to be either live audio in conjunction with serial data or streaming audio in conjunction with embedded data through run-time option selection and associated component usage (see live data source and stream data source components, immediately below). The source monitor 970 preferably provides for audio and data time synchronization through the use of necessary delays and buffering. Time synchronization is preferably configurable at run-time per instance.

The live data source sub-module 972 captures analog audio and digital serial data from a specified source, rendering audio content and rendering serial data content. The rendering of data content is exposed to client components through events. The capturing and rendering of audio content provides for configurable fading to reduce transition artifacts. In a preferred embodiment, analog audio capture is preferably based on Microsoft's Direct Show filter graphs rather than the Windows Media Player to allow for future scaling of multiple independent instances per physical machine.

The stream data source sub-module 974 is responsible for capturing streaming data from a specified source, rendering stream audio content and rendering stream data content. The rendering of data content is exposed to client components through events. The capturing and rendering of audio content provides for configurable fading to reduce transition artifacts. Stream rendering is preferably based on Direct Show filter graphs rather than the Windows Media Player to allow for future scaling of multiple independent instances per physical machine.

The demand player 976 is responsible for the rendering of on-demand media content 918 and 920 for insertion. The rendering of media content provides for real-time alteration of content duration prior to playback. Content duration alteration is preferably configurable at run-time per instance. Content rendering is preferably based on Direct Show filter graphs rather than the Windows Media Player to allow for scaling of multiple independent instances per physical machine.

The source controller 978 is responsible for directing live or on-demand audio content to the encoder controller 970. The source controller allows for various necessary audio switching methods including analog hardware switching, digital mixer switching and digital filter switching. Individual switching methods are implemented as components for selection at run-time through associated component usage.

The analog switch controller sub-component 980 provides analog hardware based audio switching. The digital mixer switch controller sub-component 982 provides analog audio switching through the manipulation of a software mixer. The digital filter switch controller sub-module 984 provides audio switching through the manipulation of a digital stream software controller.

The schedule data source component 986 is responsible for the identification and retrieval of ads to be inserted based on criteria provided by the audio/data source, station parameters and/or time parameters, target audience and other criteria as required by each specific implementation of the present invention. The database selection/query necessary for this functionality utilizes local database stores, such as 906 and engines to maximize performance to provide real-time insertion capabilities.

The activity log component 988 is responsible for detailed activity logging for reconciliation with internal continuity and fulfillment systems and other necessary data consumers. Activity logs typically include general encoding activity, insertion operation activity, service errors and service configuration changes.

Figure 19:
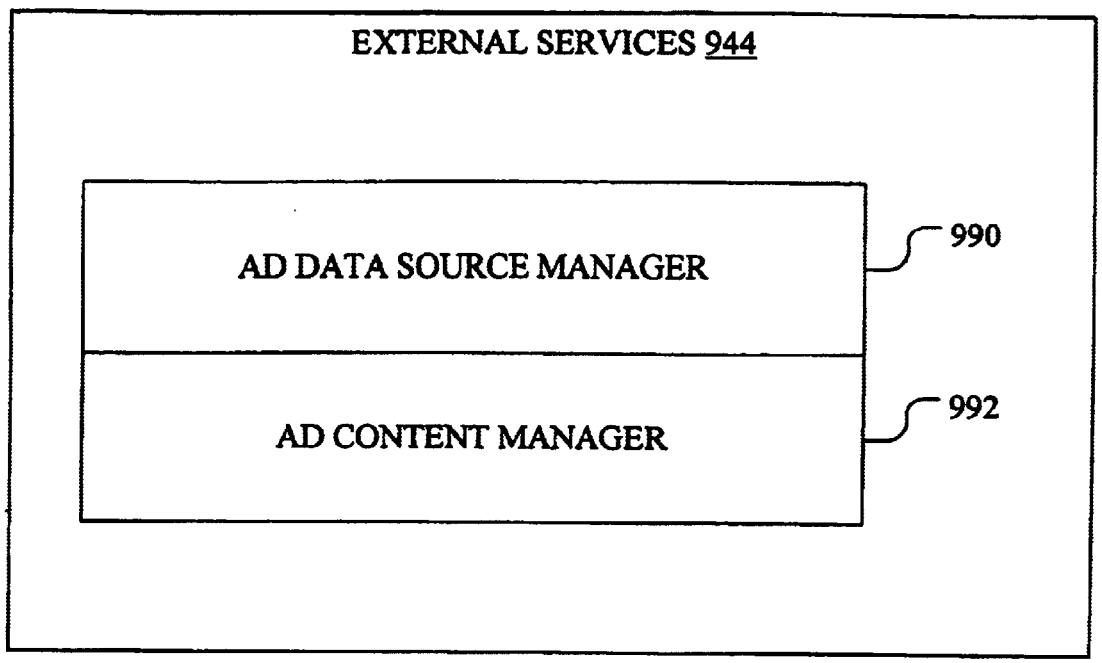
FIG. 19 is a block diagram depicting typical components in the external services module in accordance with an embodiment of the present invention.

FIG. 19 is a block diagram depicting typical components in the external services module 944, in accordance with an embodiment of the present invention.

The ad data source manager 990 provides, schedules and manages database replication actions with the central database store 906, as described below. This module preferably uses a "pull" model to retrieve the necessary updates managed and triggered by the subscriber.

If the particular embodiment of the present invention is configured such that the insertion and encoder system 904 is centrally located utilizing a high-speed WAN link or the like, as shown in FIG. 15, database replication may not be necessary. In this case, remote database access could be achieved directly to the central database store by the ad data source component 946.

The ad content manager 992 is typically responsible for insuring the media content identified by the ad data source are available locally for on-demand insertion. The media content is typically replicated from the central media repository 906.

Note that if the encoder is centrally located utilizing a high-speed WAN or the like, as shown in FIG. 15, the on-demand media content will still be necessary for real-time insertion. However, in this case, remote retrieval could be implemented through a caching mechanism just prior to insertion.

Figure 20:
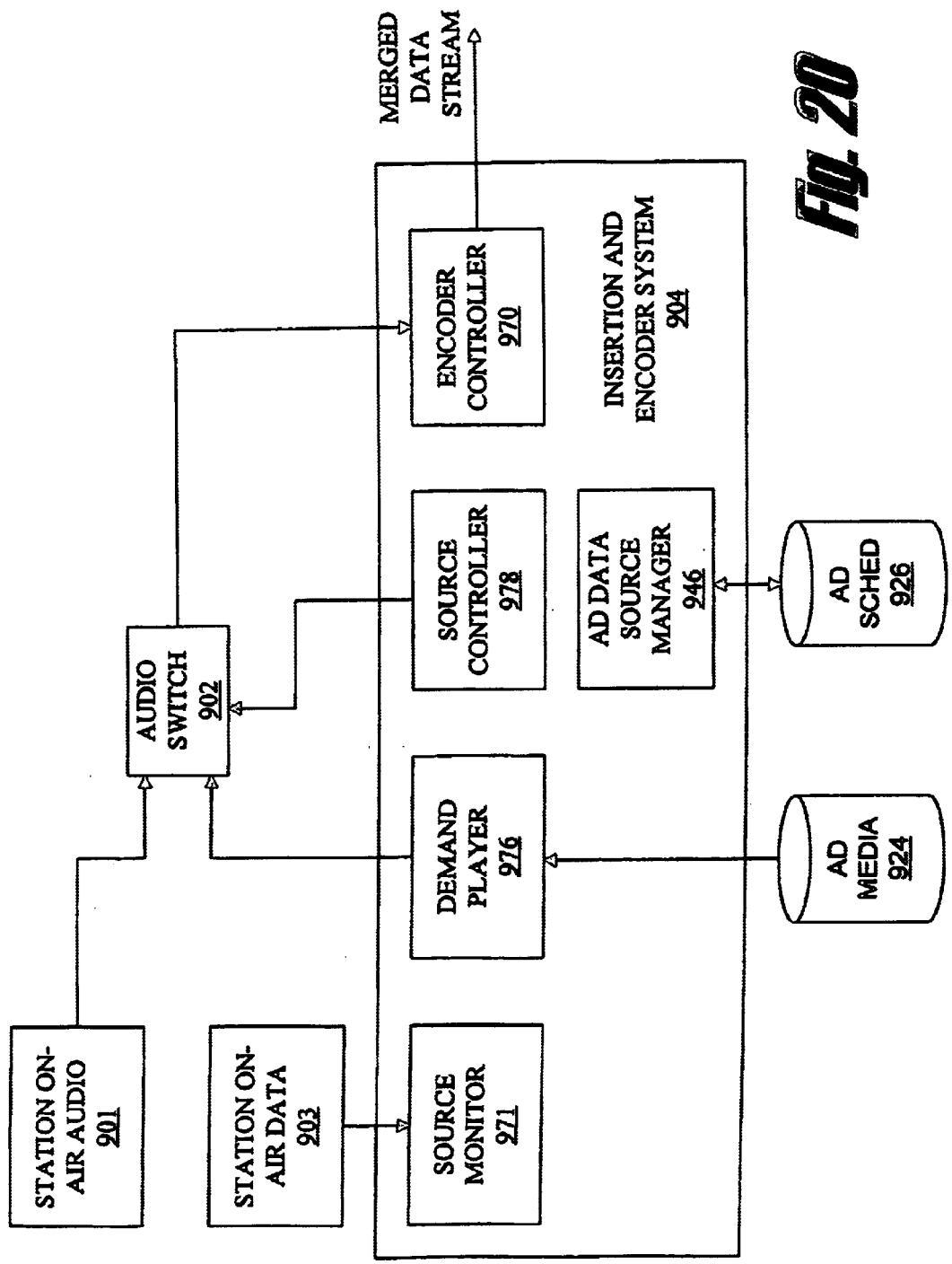
FIG. 20 is a block diagram depicting some of the functional components of the insertion and encoder system 904 and their interaction with other components of the present invention.

FIG. 20 is a block diagram depicting some of the functional components of the insertion and encoder system 904 and their interaction with other components of the present invention.

As shown, the station on-air audio 901 is fed into an audio switch 902. Any type of audio switch can be used, including an analog, digital mixer or digital filter switch. The source controller module 978 controls the position of the audio switch 902 to select between the inputs from the on-air audio 901 or streaming audio from the demand player 976.

The source monitor 971 monitors the data from the on-air system 903 on a continual basis. When an ad is to be substituted, the demand player 976 retrieves the substituted ad from the ad media data store 924 and sends it the switch 902.

The ad data source manager 946 maintains the schedules for the ads and keeps track of which ads have been played by the system. The encoder controller module 970 merges the audio and data information and sends out an merged data stream to the appropriate server.

Figure 21:
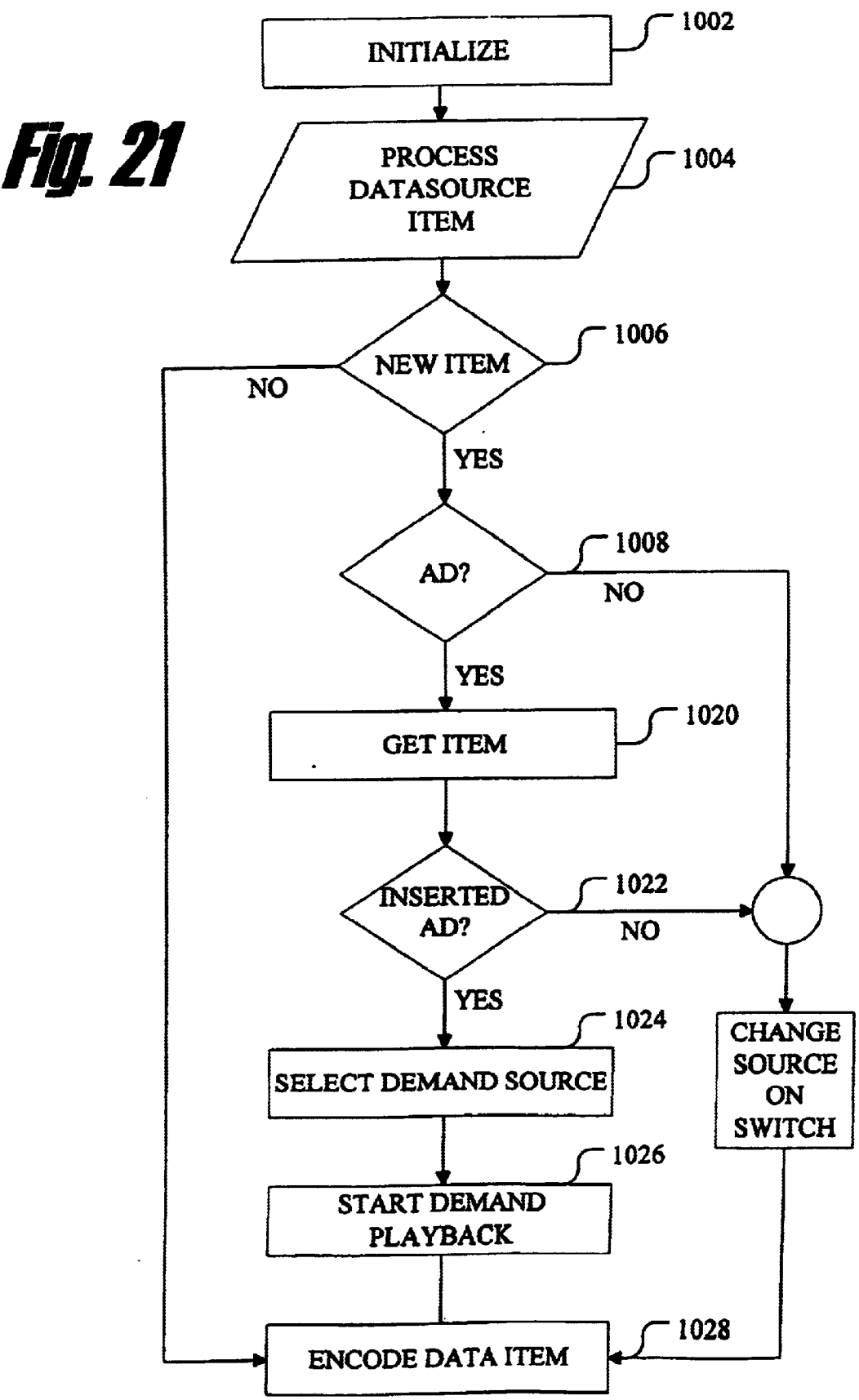
FIG. 21 is a flowchart of a process that can be used to implement part of the functionality of the service manager in accordance with one embodiment of the present invention.

FIG. 21 is a flowchart of a process that can be used to implement part of the functionality of the service manager 946 in accordance with one embodiment of the present invention.

The process begins with an initialization routine in step 1002. Next, in step 1004 the a data source item is processed A data source item is the same as a segment, as described above with reference to FIG. 14. For example, an advertisement, a news segment or a song can be a data source item. Next, as indicated by step 1006, the process determines if the data source item from step 1004 is a new item. This step is required because the process in FIG. 21 may be called on a period basis by the calling program. Consequently, if the data source item is already being processed from a previous call, it is not new and control passes to step 1028, where the data item is encoded.

If the data item is new, control passes to step 1008. In step 1008, the process determines whether or not the data item is an advertisement. This is accomplished by reading the cut code table to determine the identity of the data item. If step 1006 determines that the data item is not an ad, control passes to step 1010, where the switch 902 is set to a position such that the on-air audio 901 is passed to the switch output 909. Control then passes to step 1028, where the encoding process continues.

If the item is not an advertisement, as determined in step 1008, control passes to step 1020, where the ad item is retrieved. In one embodiment, this is accomplished by calling the ad data source module 946. Typically, either an inserted ad, or the on-air ad is returned from this call. A process that can be used to implement the get item step in the ad data source module is described below with reference to FIG. 22. Next, as indicated by step 1022, the process determines if the returned data item from the get item function call is an inserted ad. If not, the process continues with step 1110, where the where the switch 902 is set to a position such that the on-air audio 901 is passed to the switch output 909. Control then passes to step 1028, where the encoding process continues.

If the get item function call returns an inserted ad, control passes to step 1024. In step 1024 the demand data source is selected on the switch input 902. Next, as indicated by step 1026, the demand playback is initiated. This is where the actual audio data stream representing the substituted ad is played. Finally as indicated by step 1028, the data item is encoded. In one embodiment, this process is called on a periodic basis from the service manager module.

Figure 22:
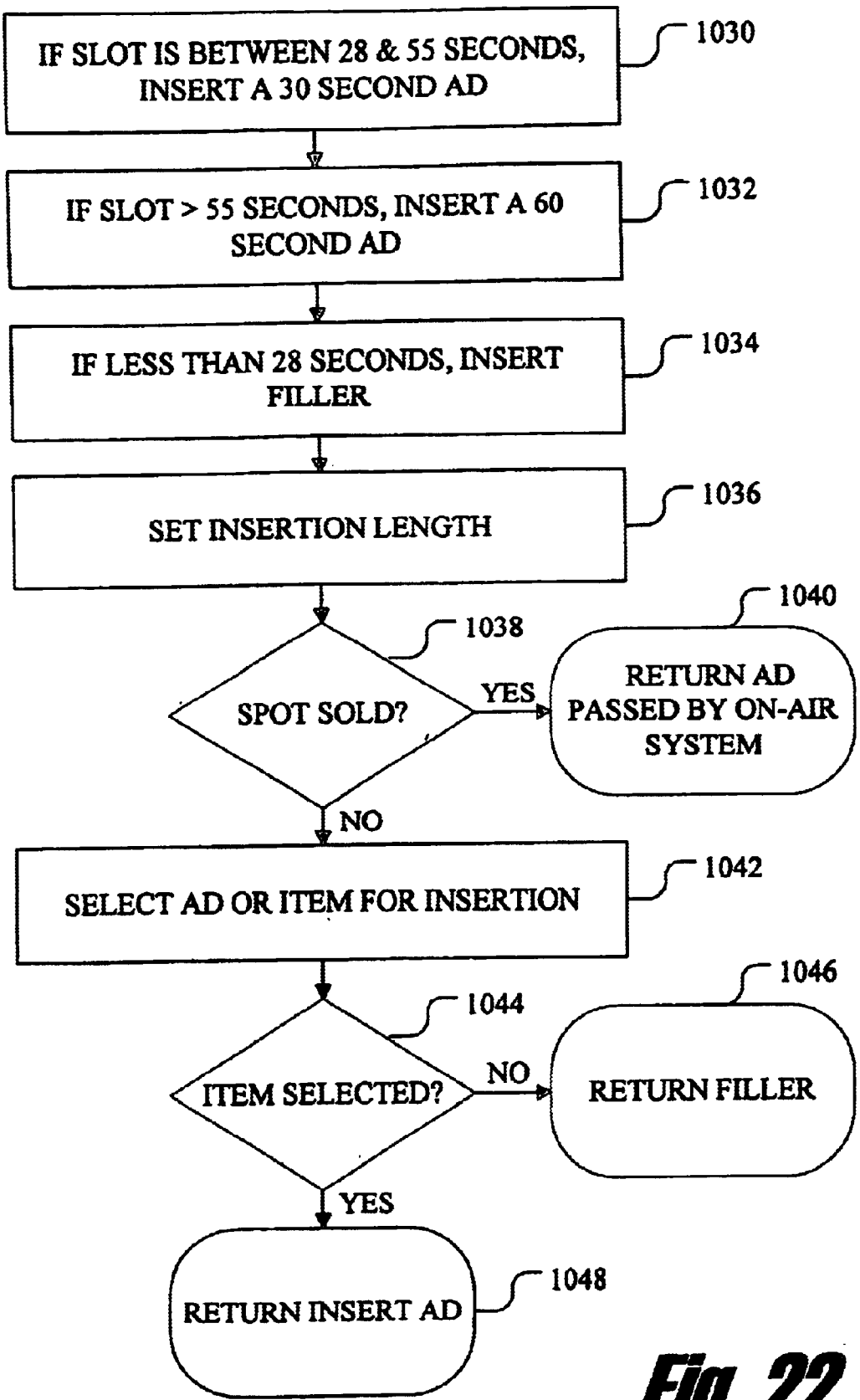
FIG. 22 is a flowchart depicting a process that can be used to implement the get item step in FIG. 21, in accordance with one embodiment of the present invention.

FIG. 22 is a flowchart depicting a process that can be used to implement the get item step 1006, in accordance with one embodiment of the present invention. Typically, this function is implemented in the ad data source module 946. The process begins with step 1030, where the process determines whether the advertising slot is between 28 and 55 seconds. In this example, it is assumed that all sold ads in the master database 906 are either 30 or 60 seconds in duration. In other embodiments, the spots can be of any length. Further, the time calculations used herein are for exemplary purposes only and should not be construed to limit the scope and breadth of the present invention.

In this example, as indicated by step 1032, if the substituted advertisement is between 28 and 55 seconds, the process inserts a 30 second ad into that spot. This can be accomplished by compressing or stretching the inserted ad as appropriate. Next, as indicated, if the spot is more than 55 seconds, a 60 second ad will be used in that time slot.

Next, as step 1034 indicates, if the spot is less than 28 seconds, a filler is inserted. The filler can be anything from dead air to a public service announcement. Next, as indicated by step 1036, the insertion length is set to either 30 or 60 seconds depending on the results from steps 1030–1034.

In step 1038, the process determines if the advertisement spot had been sold to global market. In one embodiment, this is accomplished by reading an "order-type" attribute from the cut code table. This attribute identifies whether the ad has been sold for the local or global market. If step 1038 determines that the ad is sold for the global market, control passes to step 1040. In step 1040 the process returns the sold ad to the calling program. In this case, the ad data source module 946 informs the service manager module 946 that the spot being broadcast by the on-air system should be passed through to the distribution point 910, as is.

If step 1038 determines that the ad had not been sold, control is passed to step 1042. In step 1042 the method attempts to find an ad from the master database 906 that matches certain predefined criteria. The predefined criteria used to select ads depend on each specific implementation of the present invention and varies widely with different embodiments.

At the very least, the insertion length set in step 1036 is used to select a 30 second or 60 second ad, in this example. Typically, schedule data, including flight times, (i.e. the window of dates in which the ad is scheduled to run), and the time of day is considered. The availability of the ads and the number of times the ads are scheduled to run are also typically considered by the rule engine used to select an inserted ad.

In one example, ads are ranked in an order of most/least recently played. Typically the selection process gives preference to the ads played more remotely in time. Another rule that is typically implemented is one that does not allow, for example, the same ad to be played twice in the same hour.

Other considerations that can be taken into account are related to the demographics of the listeners. That is, ads can be targeted to specific groups of users, such as males, females, certain age brackets, financial status, employment type, etc. In one embodiment, this targeting is accomplished by accessing the appropriate database which only contains advertisements that are associated with particular demographics of users. For example, in one embodiment, the ad media database 924 only contains ads that are suitable for males, ages 18–34. In this example, the broadcast server 910 is servicing users in that demographic group. In other embodiments, the selection routine is used to select an appropriate ad from a master database, in accordance with particular characteristics of users.

This aspect of the present invention is described in detail below. It is important to note at this time, however, that known characteristics of listeners are important criteria that can be considered in the selection process in step 1042. As described below, listener demographics are typically determined from user surveys that are completed by subscribers. Such users are typically assigned specific support servers in which these ads are targeted.

Next, as indicated by step 1044, if an ad is selected, its identity is returned in step 1048. Otherwise, as indicated, the process returns with a code that tells the calling program to use a filler in the advertisement time slot. As stated, a filler can be anything, such as music, a public service announcement, or dead air.

Figure 23:
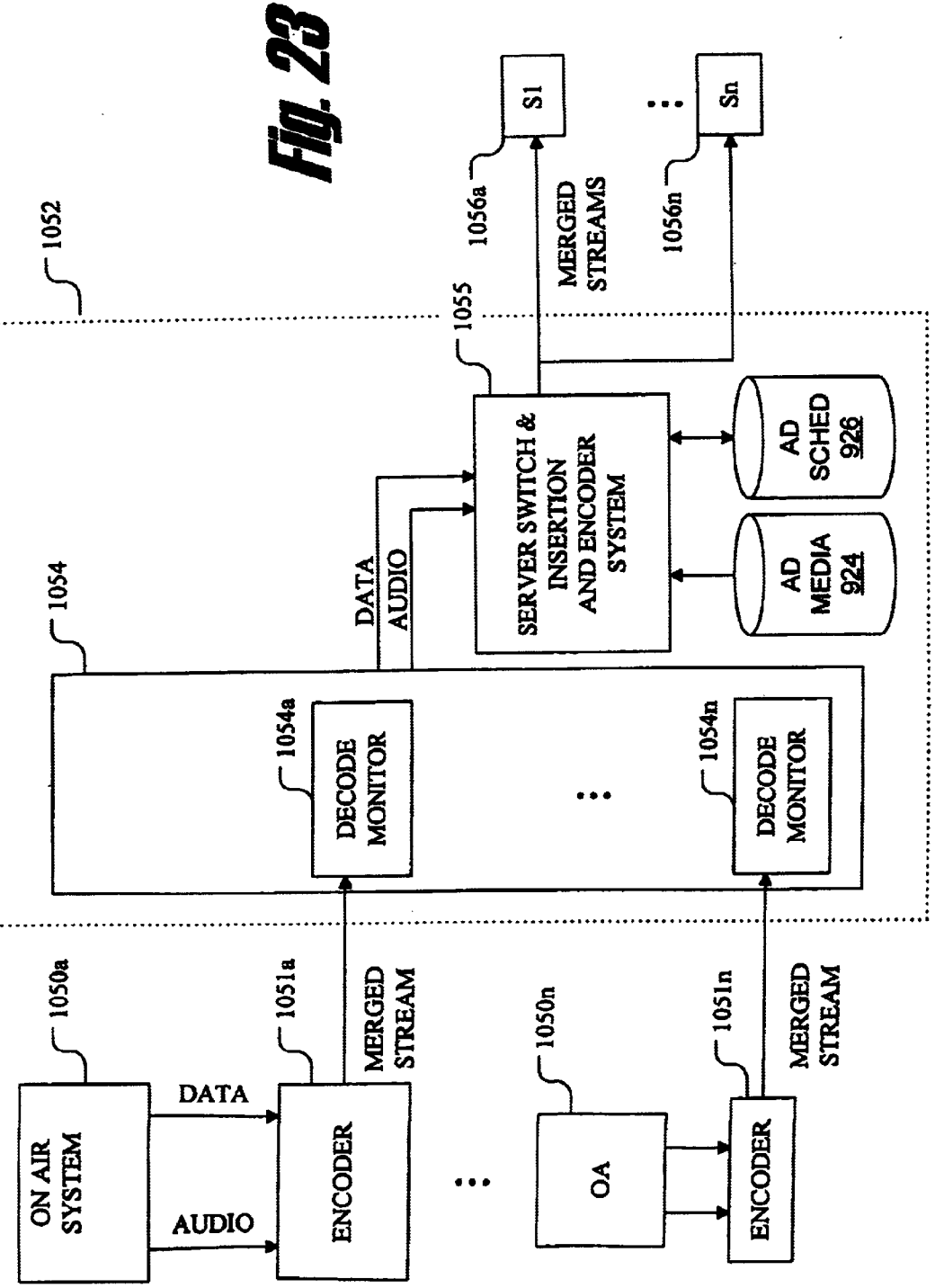
FIG. 23 is a block diagram depicting an alternate embodiment of the present invention.

FIG. 23 is a block diagram depicting an alternate embodiment of the present invention. In this embodiment, a plurality of on-air systems 1050a–1050n (generally, 1050) are coupled to a plurality of decode monitors 1054–1054n (generally 1054). In a preferred embodiment, the decode monitors 1054 are located in a central location 1052, that is remote from the on air systems 1050. The single central system 1052 performs signal decoding, ad insertion and server switching, as described below.

In this example, the central system 1052 additionally comprises a server switch, insertion and encoder system (SSIE) 1055, and a decode/monitor 1054. The SSIE 1055 is coupled with an ad media data store 924 and an ad schedule data store 926. The SSIE 1055 performs substantially the same functions as the insertion and encoder system 904 as described above. Additionally, the SSIE 1055 functions as a server switch to select among a plurality of servers 1056a–1056n (generally, 1056) for delivery of the merged data stream.

In this example, each on air system 1050 is coupled an encoder 1051a–1051n (generally 1051). The encoders 1051 function in a similar fashion as the encoders 503 as described above. That is, the primary function of the encoders 1051 is to merge the audio and data signals form each associated on-air systems 1050 to create a merged data stream output. The merged data stream output from each encoder 1051 serves an input to a n to 1 multiplexer. As shown, the n to 1 multiplexer 1053 accepts n inputs and has one output. Thus, at any single instant in time, a single merged data stream from one of the encoders 1051 is fed into the decode monitor 1054 in the central system 1052.

The decode monitor 1054, functions in a similar fashion as the source monitor 971 described above. In addition, because the input to the decode monitor 1054 is a merged data stream, the stream is first decoded. That is, the merged data stream is decoded into separate audio and data signals as shown.

Once this is done, the decode monitor 1054, monitors the data signal to determine the presence of advertisement segments. The remaining logic is identical to that described above, with reference to the insertion and encoder system 904.

In addition logic is added to select a particular server 1056a–1056n from a plurality of servers. Accordingly, using this example embodiment, a single central server can be used to service a plurality of broadcast server machines 1056 and a plurality of on-air systems/encoders.

In addition, specific advertisements can be selected depending on the server 1056 being targeted. For example, suppose the servers 1056a–1056n comprise four servers, S1, S2, S3 and S4. Further suppose that S1 services users that are female and between the ages of 18–35. S2 services users that are male and between the ages of 18–35. S3 services females that are over 35 and S4 services males that are over 35.

In this example, the selection logic or rule engine in the SSIE component 1055 uses this information to select appropriate ads for the appropriate server. Thus, for example, a national ad for Coke may be selected for servers S1 and S2 (18–34 male and females), while a national ad for a particular cruise vacation may be selected only for the servers S3 and S4 (over 35, male and females). Similarly, an ad for Viagra intended for the global market may be only selected for S4 (males over 35), while a national ad for a particular pop singer may only be targeted for server S1 (females between 18–35).

Thus, this example embodiment provides increased value to radio stations and national advertisers in that it increases their potential and real available advertisement inventory. In addition, this dynamic advertisement target delivery system will improve the experience for the interactive listener by providing advertisement content that is within their interest.

Typically, users that subscribe to the system will complete a user survey that describes their particular demographics and interests. This data is used to assign particular servers 1056 to certain groups of users. In this fashion, not only are local ads substituted for national ads, for example, but general ads are substituted for ads of particular interest to the user group.

It is noted that in the examples presented herein, the term local ads is sometimes used to describe an ad that is being substituted by, for example, a national ad. This is just one example of an implementation of the present invention. In general, as stated above, any type of segment can be substituted for any other type of segment. In one example, a local coordinated ad is substituted, but a local audio only ad is substituted for a coordinated advertisement. Accordingly, the examples used herein should not be construed to limit the scope and breadth of the present invention. For simplicity, segments that are candidates for substitution are referred to herein as "unsold ads", while segments that are not are referred to herein as "sold ads".

From the radio stations perspective, unsold ads in which no additional revenue is generated are substituted for sold ads that are targeted for specific audiences, thereby increasing the value for all concerned, i.e. the radio stations, the advertisers and the listeners.

Figure 24:
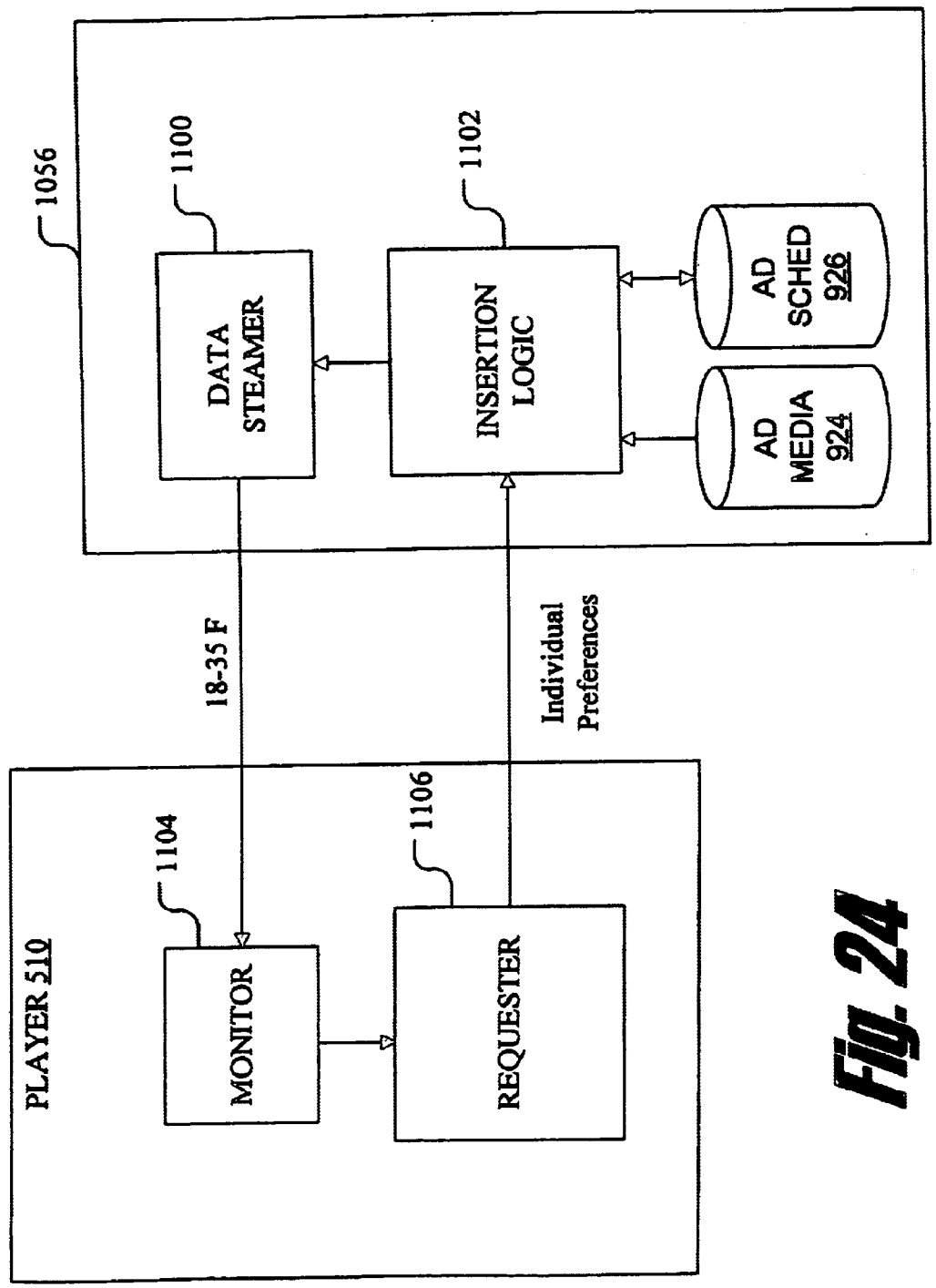
FIG. 24 is a block diagram depicting another embodiment of the present invention that can be used to target ads according to individual preferences.

FIG. 24 is a block diagram depicting another embodiment of the present invention that can be used to target ads according to individual preferences. In this embodiment, a server 1056 comprises a data streamer 1100, insertion logic 1102 and the ad media and schedule data stores 924 and 926, respectively. In this example embodiment, the monitor logic 1104 resides in the user's player device 510. In this fashion, the incoming data stream is monitored for the presence of an advertisement segment.

When an advertisement segment is detected, a requester 1106 sends a signal to the server 1056 that indicates individual preferences. This can include for example, interests, hobbies, etc. The information on individual preferences can come from a number of sources including user surveys, user web interaction, etc.

Once the request is received by the insertion logic module 1102 in the server 1056, an ad is selected. The selection is based on general selection criteria, such as schedule, sold/unsold status, flight times, duration, last play date, time, etc., as described above. But in addition, the individual preferences sent by the requester 1106 is also taken into account to select a specific ad that most closely matches the individual preferences of the user. In this fashion, ads can be more precisely targeted to individual users. In addition, this example shows that the user is connected to a particular server 1056 that services a particular demographic group, in this case 18–35 females. In this fashion, the data stores maintained by each server 1056 is more easily managed and controlled for content. In other embodiments, ads for all demographic groups are in the data stores 924 and 926 serviced by the server 1056.

Figure 25:
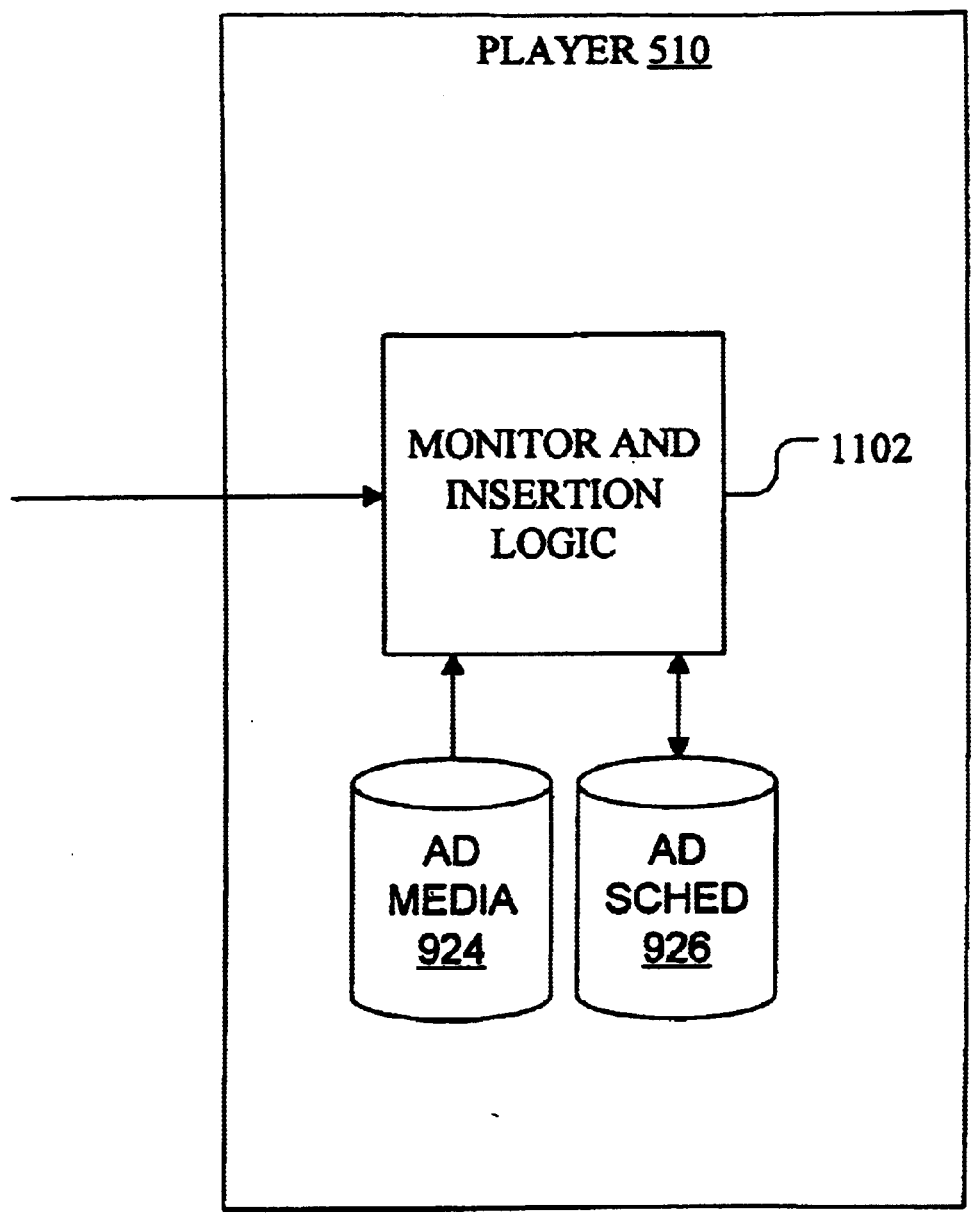
FIG. 25 is a block diagram depicting another embodiment of the present invention.

FIG. 25 is a block diagram depicting another embodiment of the present invention. In this embodiment, the monitor/insertion logic, and the advertisement databases are placed in the user player device 510. In this embodiment, individual references are also used to select substituted unsold ads.

In this example embodiment, the ad media and ad schedule data stores, 924 and 926, respectively, are downloaded by the individual user into the user local storage device. A monitor and insertion logic module 1108 is added to the player 510 as shown. The monitor and insertion logic device 1108 monitors the incoming data stream to detects the presence of unsold advertisements. The selection logic, is then based on criteria as described above as well as individual preferences. As Internet bandwidth increases, and the price of local storage space decreases, this embodiment may be preferred. However, in order for advertisers and radios stations to maintain control over the content of their advertising material, the embodiments presented above may be more desirable.

While various embodiments of the present invention have been shown and described above, it should be understood that they have been presented by way of example only, and not limitation. It should be apparent to those of ordinary skill in the art that many other embodiments are possible without departing from the spirit and scope of the invention. Thus, the breadth and scope of the present invention should not be limited by any of the above-described exemplary embodiments, but should be defined only in accordance with the claims and their equivalents.

What is claimed is:

1. A system for dynamically substituting a first segment in a first broadcast with a second segment in a second broadcast, said system comprising:

a broadcast system configured to generate the first broadcast comprising a first data signal and a first audio signal;

a master database comprising a plurality of substitution segments including scheduling information associated with each of said substitution segments;

an insertion and encoder system coupled to said master database and said broadcast system for dynamically substituting the first segment with the second segment from said master database;

a source monitor for monitoring said data signal for determining the presence of the first segment;

a schedule data source component for selecting the second segment from the master database in accordance with predefined criteria;

a demand player for playing said selected segment; and a source controller for switching to said demand player when said second segment is player by said demand player.

2. The system of claim 1, wherein the first broadcast is an on-air radio broadcast and the second broadcast is an Internet-based radio broadcast.

3. The system of claim 1, wherein said insertion and encoder system further includes an encoder controller for creating a merged data stream comprising an audio signal and a data signal from said second segment.

4. The system of claim 1, wherein said insertion and encoder system further includes a data source manager for maintaining schedules and tracking segments that are broadcast by said second broadcast.

5. The system of claim 1, wherein said predefined criteria includes substantially matching the length of the second segment with the length of the first segment.

6. The system of claim 1, wherein said predefined criteria includes schedule information associated with the second segment.

7. The system of claim 1, wherein said second broadcast is directed to one or more users having known demographics and wherein said predefined criteria includes matching target information from said second segment with said known demographics.

* * * * *